(12) United States Patent
Machida et al.

(10) Patent No.: US 8,515,275 B2
(45) Date of Patent: Aug. 20, 2013

(54) ILLUMINATION DEVICE FOR PHOTOGRAPHING AND CAMERA

(75) Inventors: Kiyosada Machida, Saitama (JP); Hatsuko Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 100 days.

(21) Appl. No.: 12/805,176

(22) Filed: Jul. 15, 2010

(65) Prior Publication Data

US 2010/0284675 A1 Nov. 11, 2010

Related U.S. Application Data

(63) Continuation of application No. PCT/JP2009/050561, filed on Jan. 16, 2009.

(30) Foreign Application Priority Data

Jan. 18, 2008 (JP) ................................. 2008-008882
Jun. 12, 2008 (JP) ................................. 2008-154200

(51) Int. Cl.
*G03B 15/03* (2006.01)
*G03B 7/08* (2006.01)
*H04N 5/222* (2006.01)

(52) U.S. Cl.
USPC ........... 396/225; 396/159; 396/164; 396/231; 348/371

(58) Field of Classification Search
USPC ................. 396/106, 155, 159, 164, 166, 176, 396/225, 231; 348/371
See application file for complete search history.

(56) References Cited

U.S. PATENT DOCUMENTS

| 5,895,128 | A | 4/1999 | Kishimoto et al. |
| 2003/0189665 | A1 | 10/2003 | Yamada |
| 2005/0231948 | A1 | 10/2005 | Pohlert et al. |
| 2006/0067668 | A1* | 3/2006 | Kita ............................ 396/182 |
| 2007/0096009 | A1 | 5/2007 | Ziekowski et al. |

FOREIGN PATENT DOCUMENTS

| EP | 1 176 849 | 1/2002 |
| JP | 7-29961 U | 6/1995 |
| JP | 8-201885 | 8/1996 |
| JP | 2003-215673 | 7/2003 |
| JP | 2003-299109 | 10/2003 |
| JP | 2005-55546 | 3/2005 |
| JP | 2005-215322 | 8/2005 |
| JP | 2006-85000 | 3/2006 |
| JP | 2006-148272 | 6/2006 |
| JP | 2006-285274 | 10/2006 |
| JP | 2006-304376 | 11/2006 |

OTHER PUBLICATIONS

Translation of 2005-215322.*
International Search Report for PCT/JP2009/050561, mailed on Apr. 14, 2009.
Japanese Notice of Reasons for Rejection issued to Japanese Application No. 2009-550062 mailed Aug. 28, 2012.
European Search Report for corresponding European Application 097002292.5; dated Feb. 7, 2012.

* cited by examiner

*Primary Examiner* — Rochelle-Ann J Blackman

(57) ABSTRACT

It is possible to provide a user-friendly camera. Provided is an illumination device for emitting illumination light for photographing by a camera including: a light emission unit which can emit lights of a plurality of different colors and/or a plurality of different light emission amounts as the illumination light; and a light emission control unit which controls the light emission unit so as to continuously emit the illumination light while changing the color and/or the light emission amount as the time elapses, independently of photographing by the camera.

30 Claims, 20 Drawing Sheets

ILLUMINATION DEVICE FOR PHOTOGRAPHING AND CAMERA

CROSS REFERENCE TO RELATED APPLICATIONS

This application is a continuation of International Application No. PCT/JP2009/050561, filed Jan. 16, 2009, which claimed priority to Japanese Application No. 2008-008882, filed Jan. 18, 2008, and Japanese Application No. 2008-154200, filed Jun. 12, 2008, the entire disclosures of which are incorporated by reference as a part of this application

TECHNICAL FIELD

The present invention relates to an illumination device for photographing and a camera.

BACKGROUND ART

As an illumination device that illuminates illumination light when an photographing is conducted using a camera, an illumination device is known with which a photographer sets a color temperature of illumination light on the basis of an image obtained by preparatory photographing and, at the time of actual photographing, the illumination device emits flash light with that color temperature. (For example, see Patent Reference 1).

Further, a camera is known that changes the light emission amount of the flash each time photographing is performed (for example, see Patent Reference 2).

Patent Document 1

Japanese Unexamined Patent Publication No. H08-201885

Patent Document 2

Japanese Unexamined Patent Publication No. 2006-148272

DISCLOSURE OF THE INVENTION

Problems to be Solved by the Invention

The illumination device recited in Patent Reference 1 performs preparatory photographing to set the color temperature of the flash at the time of actual photographing. Therefore, photographing takes time and a shooting opportunity may be lost due to, for example, the object moving or the like.

The camera recited in Patent Reference 2 also has a problem, in that it is difficult for a photographer to perform photographing with a desired light emission amount.

An object of the present invention is to provide a user-friendly illumination device for photographing and a camera.

Means for Solving the Problems

The present invention achieves this object with the following solution.

In claim 1, there is provided an illumination device for photographing that emits illumination light for photographing by a camera, comprising: a light emission unit capable of emitting lights of a plurality of different colors and/or lights of a plurality of different light emission amounts as the illumination light; and a light emission control unit that controls the light emission unit and causes the light emission unit to continuously emit the illumination light while changing the color and/or the light emission amount as time elapses, independently of photographing by the camera.

In claim 2, there is provided an illumination device for photographing according to claim 1, wherein a light emission control unit is provided to be capable of selecting, as a mode in which the color of the illumination light is changed from a first color to a second color, a continuous change mode that emits continuous light while changing tone from the first color to the second color and a direct change mode that directly changes from the first color to the second color.

In claim 3, there is provided an illumination device for photographing according to claim 2, wherein the first color is a complementary color of the second color.

In claim 4, there is provided an illumination device for photographing according to claim 1, wherein a change speed of the color can be arbitrarily specified.

In claim 5, there is provided an illumination device for photographing according to claim 1, wherein a change pattern of the color can be arbitrarily specified.

In claim 6, there is provided an illumination device for photographing according to claim 5, wherein the light emission control unit sets the color change pattern on the basis of a result of photometry of object light.

In claim 7, there is provided an illumination device for photographing according to claim 1, wherein the light emission control unit can pause the change of color and cause the light emission unit to emit illumination light of an arbitrary color.

In claim 8, there is provided an illumination device for photographing according to claim 1, wherein the light emission control unit causes the light emission unit to emit light, switching in a chronological sequence between a first light emission pattern that continuously emits the illumination light while changing the light emission amount and a second light emission pattern that continuously changes the illumination light while changing the color.

In claim 9, there is provided an illumination device for photographing according to claim 8, wherein the light emission control unit causes light emission to be executed in the second light emission pattern, after the first light emission pattern is executed and the light emission amount is set.

In claim 10, there is provided an illumination device for photographing according to claim 8, wherein the first light emission pattern includes a plurality of light emission amount changing light emission patterns with mutually different modes of light emission amount change, the second light emission pattern includes a plurality of color changing light emission patterns with mutually different modes of color change, and the light emission control unit selects a corresponding light emission pattern from the plurality of light emission amount changing light emission patterns and/or the plurality of color changing light emission patterns on the basis of a plurality of photographing modes specified in advance in the camera for performing exposure control in accordance with photographing scenes.

In claim 11, there is provided a camera capable of using the illumination device for photographing according to claim 1, comprising: a display unit capable of displaying a color distribution in which hues and brightnesses of the illumination light are arranged in a matrix, and a light emission pattern input and specification unit capable of specifying and inputting a continuous change pattern of hue and brightness of the illumination light on the color distribution displayed at the display unit.

In claim 12, there is provided a camera using the illumination device for photographing according to any one of claim 1 to claim 10 comprising: an imaging unit that converts object light to electronic signals and outputs the same; a display unit that displays a through-image generated on the basis of output from the imaging unit; and a display control unit that causes at least one of a change pattern of color of the illumination light and a state of change of color of the illumination light to be displayed at the display unit together with the through-image.

In claim 13, there is provided a camera according to claim 12, wherein a partial region of the through-image is displayed magnified at the display unit during illumination of the illumination light.

In claim 14, there is provided a camera according to claim 13, wherein the display unit displays the whole of the through-image and displays the magnified display superimposed on the display of the whole of the through-image.

In claim 15, there is provided a camera according to claim 12, wherein the display unit displays the whole of the through-image in a predetermined display region and displays a portion of the through-image magnified in a display region larger than the predetermined display region.

In claim 16, there is provided a camera according to claim 12, wherein the illumination device for photographing keeps the color of the illumination light constant while the imaging unit is imaging an image to be recorded to a recording medium.

In claim 17, there is provided a camera according to claim 12, wherein a photographing control unit is provided that, if an photographing start instruction signal is inputted during illumination of the illumination light, accordingly executes an photographing operation of a still image.

In claim 18, there is provided a camera according to claim 17, wherein the light emission control unit continues illumination of the illumination light when the photographing control unit finishes the photographing operation and, if the photographing start instruction signal is inputted a plurality of times during illumination of the illumination light, there is provided photographing control unit executes the photographing operation in accordance with each of the plurality of inputs.

In claim 19, there is provided a camera according to claim 17 or claim 18 wherein, if a photographing reservation signal is inputted during illumination of the illumination light, there is provided photographing control unit accordingly accepts the photographing reservation and executes the photographing operation when the color of the illumination light changes and is again substantially the same as the color at the moment at which the photographing reservation signal was inputted.

In claim 20, there is provided a camera according to claim 19 wherein, when the photographing control unit performs the photographing operation in accordance with the photographing reservation, there is provided photographing control unit also performs an photographing operation at least one of a timing earlier and a timing later than a timing at which the photographing operation is performed.

In claim 21, there is provided a camera according to claim 20, wherein the light emission control unit, before or after performing the photographing operation in accordance with the photographing reservation, performs control to continuously change the light amount of the illumination light while fixing the color of the illumination light at the color at the moment at which the photographing reservation signal was inputted, and the photographing control unit also performs an photographing operation at least one of a timing earlier and a timing later than a timing at which the light amount is substantially the same as the light amount at the moment at which the photographing reservation signal was inputted.

In claim 22, there is provided a camera according to claim 12, wherein the camera includes a release operation member provided to be externally operable to cause an photographing operation to be executed and, in accordance with an operation of the release operation member, there is provided light emission control unit starts control that causes the color of the illumination light to change.

In claim 23, there is provided a camera according to claim 12, comprising: a release operation member provided to be externally operable to cause an photographing operation to be executed; and a light emission instruction operation member provided to be externally operable separately from the release operation member, and wherein in accordance with an operation of the light emission instruction operation member, there is provided light emission control unit starts control that causes the color of the illumination light to change.

In claim 24, there is provided a camera according to claim 12 wherein the illumination light illuminated from the illumination device for photographing is used as an autofocus assist beam during an autofocus operation.

In claim 25, there is provided a camera according to claim 24, wherein the color of the autofocus assist beam is emitted with a color matching a spectral response characteristic of a light detection sensor.

In claim 26, there is provided a camera according to claim 24 or claim 25, wherein the illumination device for photographing starts emission of the illumination light directly after finishing illumination of the illumination light as the autofocus assist beam.

In claim 27, there is provided an illumination device for photographing according to claim 1, wherein the light emission control unit is provided with, as modes in which the light emission amount of the illumination light is changed, a light emission amount increasing mode that progressively increases the light emission amount of the illumination light as time elapses and a light emission amount decreasing mode that progressively decreases the light emission amount of the illumination light as time elapses.

In claim 28, there is provided an illumination device for photographing according to claim 27, wherein the light emission control unit can arbitrarily specify a change speed of the light emission amount.

In claim 29, there is provided an illumination device for photographing according to claim 27, wherein the light emission control unit can arbitrarily specify a change range of the light emission amount.

In claim 30, there is provided an illumination device for photographing according to claim 27, wherein the light emission control unit can set a change range of the light emission amount on the basis of a result of photometry of object light.

In claim 31, there is provided an illumination device for photographing according to claim 27, wherein the illumination light illuminated from the illumination device for photographing is used as an autofocus assist beam during an autofocus operation.

In claim 32, there is provided an illumination device for photographing according to claim 31, wherein the illumination device for photographing starts control to change the light emission amount of the illumination light directly after finishing illumination of the illumination light as the autofocus assist beam.

In claim 33, there is provided an illumination device for photographing according to claim 27, wherein the illumination device for photographing keeps the light amount of the illumination light constant while the imaging unit is imaging an image to be recorded to a recording medium.

In claim 34, there is provided a camera using the illumination device for photographing according to claim 27, providing: an imaging unit that converts object light to electronic signals and outputs the same; a display unit that displays a through-image generated on the basis of output from the imaging unit; and a display control unit that, in a state in which the through-image is displayed at the display unit, performs control to, while illuminating continuous light at the object from an illumination device that illuminates illumination light for photographing, change the light emission amount of the illumination light.

In claim 35, there is provided a camera according to claim 34, wherein the display unit is provided to be capable of displaying an indicator representing a state of change of the light emission amount of the illumination light.

In claim 36, there is provided camera according to claim 34 or claim 35, wherein a partial region of the through-image is displayed magnified at the display unit during illumination of the illumination light.

In claim 37, there is provided a camera according to claim 36, wherein the display unit displays the whole of the through-image and displays the magnified display superimposed on the display of the whole of the through-image.

In claim 38, there is provided a camera according to claim 36, wherein the display unit displays the whole of the through-image in a predetermined display region and displays a portion of the through-image magnified in a display region larger than the predetermined display region.

In claim 39, there is provided a camera according to claim 34, wherein an photographing control unit is provided that, if an photographing start instruction signal is inputted during illumination of the illumination light, accordingly starts an photographing operation.

In claim 40, there is provided a camera according to claim 39, wherein the light emission control unit continues illumination of the illumination light when the photographing control unit starts the photographing operation and, if the photographing start instruction signal is inputted a plurality of times during illumination of the illumination light, there is provided photographing control unit starts the photographing operation in accordance with each of the plurality of inputs.

In claim 41, there is provided a camera according to claim 39 or claim 40 wherein, if an photographing reservation signal is inputted during illumination of the illumination light, the photographing control unit accordingly accepts the photographing reservation and starts the photographing operation when the light emission amount of the illumination light changes and the light emission amount is again substantially the same as the light emission amount at the moment at which the photographing reservation signal was inputted.

In claim 42, there is provided a camera according to claim 41 wherein, when the photographing control unit performs the photographing operation in accordance with the photographing reservation, the photographing control unit also performs an photographing operation at least one of a timing earlier and a timing later than a timing at which the photographing operation is performed.

In claim 43, there is provided a camera according to claim 34, wherein the camera includes a release operation member provided to be externally operable to cause an photographing operation to be executed and, in accordance with an operation of the release operation member, the light emission control unit starts the control.

In claim 44, there is provided a camera according to claim 34 including: a release operation member provided to be externally operable to cause an photographing operation to be executed; and a light emission instruction operation member provided to be externally operable separately from the release operation member, and wherein, in accordance with an operation of the light emission instruction operation member, the light emission control unit starts the control.

Effects of the Invention

According to the present invention, it is possible to provide a user-friendly camera.

Figure 1A:
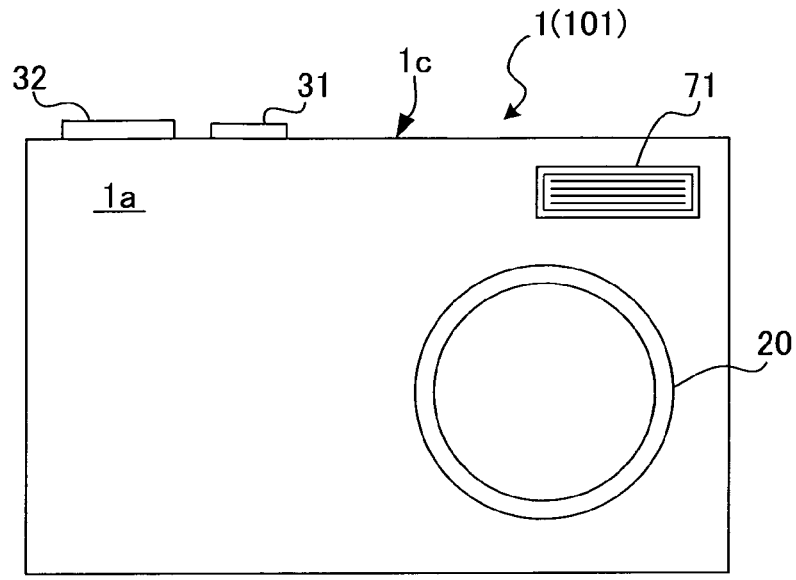
FIG. 1 is an exterior view of a camera of a first embodiment.

EXPLANATION OF REFERENCE NUMERALS 1,101,201,301: camera, 60: LCD monitor, 70: LED unit, 90,190,290,390: ASIC, 91,191,291,391: photographing control unit, 92,192,292,392: light emission control unit, 93,193, 293,393: display control unit

PREFERRED MODE FOR CARRYING OUT THE INVENTION

First Embodiment

Herebelow, a first embodiment of a camera including an illumination device for photographing that employs the present invention is described.

Figure 1B:
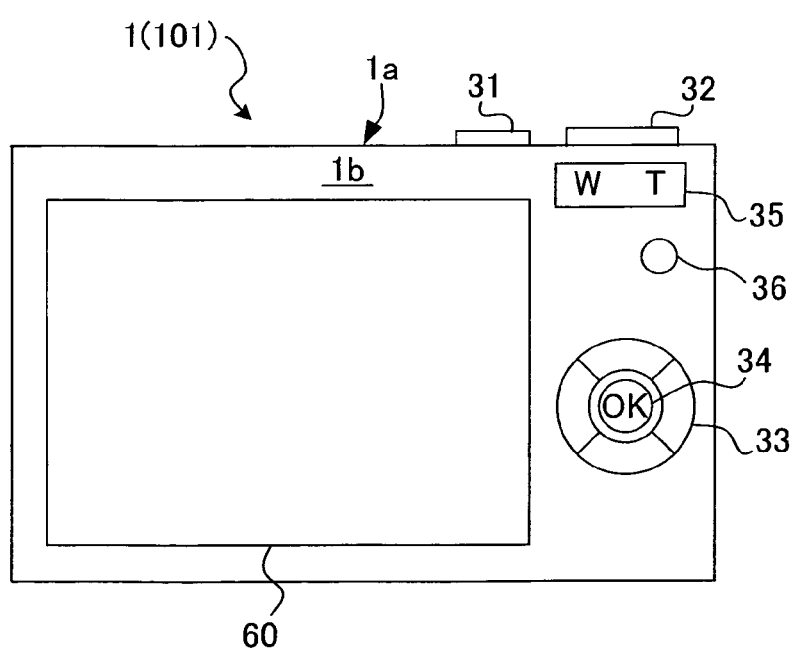

FIG. 1 is an exterior view of the camera of the first embodiment, which are plane views when the camera is viewed from the front in FIG. 1A and when the camera is viewed from the rear in FIG. 1B.

As illustrated in FIG. 1, a camera 1 is provided with a casing formed in a substantially rectangular box shape. A front face portion 1a and a rear face portion 1b are each formed in rectangular shapes in plane view.

Figure 2:
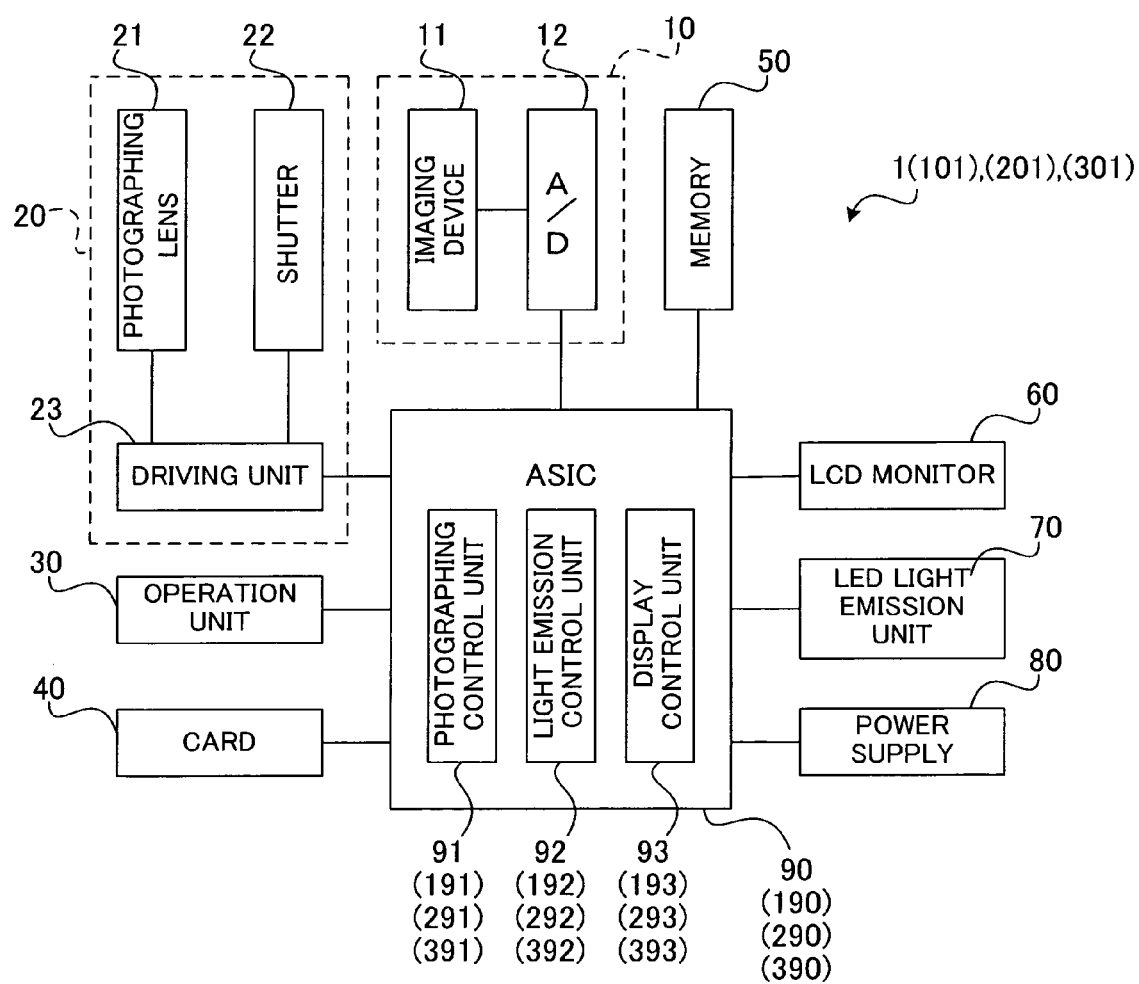
FIG. 2 is a block diagram illustrating the structure of the camera illustrated in FIG. 1.

FIG. 2 is a block diagram illustrating the structure of the camera illustrated in FIG. 1.

As illustrated in FIG. 2, the camera 1 is provided with an imaging unit 10, a lens barrel 20, an operation unit 30, a card 40, a memory 50, a liquid crystal display (LCD) monitor 60, a light emitting diode (LED) light emission unit 70, a power supply 80, ASIC (an application-specific integrated circuit) 90, and so forth.

The imaging unit 10 is provided with an imaging device 11 and an A/D converter 12.

The imaging device 11 includes optoelectronic conversion elements that convert object light that has passed through a photographing lens 21, described below, to electronic signals and output the electronic signals.

For example, an image sensor of a charge-coupled device (CCD), a complementary metal oxide semiconductor (CMOS) or the like may be used at the imaging device 11. The electronic signals outputted from the imaging device 11 are subjected to analog processing (gain control and the like) by an unillustrated signal processing circuit and are then inputted to the A/D converter 12.

The A/D converter 12 converts the electronic signals that have been analog-processed by the signal processing circuit to digital signals and outputs the digital signals to the ASIC 90, which is described below.

The lens barrel 20 includes a photographing lens 21, which includes a zoom lens and the like, a shutter 22, a driving unit 23 and so forth. The camera 1 is configured such that object light is guided to the imaging device 11 provided at the imaging unit 10 by the photographing lens 21 provided at the lens barrel 20. The shutter 22 regulates exposure duration onto the imaging device 11 and operates to open and shut at the time of photographing.

The driving unit 23 includes, for example, an actuator that drives the photographing lens 21 in the optical axis direction, an actuator that drives the shutter 22, and the like.

The operation unit 30 operates when the photographer is performing inputs to the below-described ASIC 90. As illustrated in FIG. 1, the operation unit 30 includes a power switch 31 and a release button 32 provided at an upper face portion 1c of the casing, a selector switch 33, a set button 34, a zoom button 35 and a light emission start button 36 provided at the rear face portion 1b of the casing, and the like.

The power switch 31 is a push-button switch provided protruding from the upper face portion 1c of the casing. The photographer can turn the power supply of the camera 1 on and off by pressing this power switch 31.

The release button 32 is a push-button switch capable of two operations, a half-press operation and a full-press operation. The release button 32 is disposed adjacent to the power switch 31. The photographer can send a signal instructing the execution of an autofocusing (AF) operation to the ASIC 90 by performing the half-press operation of the release button 32. In response, the ASIC 90 carries out, for example, contrast detection-based AF control to automatically focus on a principal object and AE control to automatically set the exposure, on the basis of outputs of the imaging unit 10. Then, the photographer can send a signal instructing the start of photographing to the ASIC 90 by performing the full-press operation of the release button 32.

The selector switch 33 (a rotary multi-selector) is used, for example, when selecting an item or image in a state in which a menu screen, a thumbnail display of photographed images or the like is displayed at the below-described LCD monitor 60, and the like.

The set button 34 is used when an operation corresponding to an item selected by the selector switch 33 in a menu screen is to be executed by the camera 1, and the like.

The zoom button 35 is used when changing an angle of view at a time of photographing, when magnifying or reducing the display of an image in a state in which an photographed image is being replayed at the LCD monitor 60, and the like.

The light emission start button 36 is a push-button switch that is operated when the emission of illumination light for photographing by the below-described LED light emission unit 70 is started. The camera 1 of the present embodiment starts the illumination of illumination light at the time of photographing, after the AF operations and the like in accordance with operation of the release button 32. However, the LED light emission unit 70 can be caused to emit illumination light by an operation of pressing the light emission start button 36.

The card 40 is, for example, a non-volatile recording medium such as a Flash memory or the like, which records data of photographed images and the like. The card 40 is detachably mounted at the camera 1, and a drive device (recording device) for writing data to the card 40 is provided in the camera 1.

The memory 50 functions as a work area for the ASIC 90 and stores various kinds of data, including light emission amount control information, which is described below.

In the camera 1, image data outputted from the imaging unit 10 at the time of photographing is temporarily saved to the memory 50, and is thereafter written to the above-described card 40. In the present specification, the term "photographing" is intended to include not just the writing of image data to the card 40 but also the temporary saving of image data to the memory 50.

The LCD monitor 60 is a display device, a display screen of which is provided at the rear face portion 1b of the casing, and can display photographed images, menu screens and the like.

The camera 1 includes a function that, during framing, displays an object image on the LCD monitor 60 substantially in real time (hereinafter referred to and described as a through-image), on the basis of outputs from the imaging unit 10. The photographer can set the photograph composition while checking this through-image.

The LED light emission unit 70 is a unit that illuminates illumination light for photographing at an object P (see FIG.

3) or the like through a light emission window 71 (see FIG. 1) provided at the front face portion 1a of the camera 1.

he LED light emission unit 70 includes single-color LEDs of three types: A red LED, a green LED and a blue LED. By suitably controlling light emission amounts of the LEDs, the LED light emission unit 70 can selectively emit white light, light colored red, green or blue, and so forth. By suitably changing light emission amount ratios of the single-color LEDs, the LED light emission unit 70 can emit light colored yellow, cyan, magenta and so forth.

The LED light emission unit 70 of the present embodiment of the camera is provided with a light emission amount control circuit including, for example, plural transistors and such (the light emission control circuit is not illustrated). A light emission control unit 92 provided at the ASIC 90, described below, controls current amounts flowing to the LEDs of the respective colors, by performing control to turn the plural transistors provided in the light emission control circuit on and off, and arbitrarily changes the color of the illumination light illuminated from the LED light emission unit 70 by changing the ratios of the light emission amounts from the LEDs of the respective colors. The number of LEDs provided at the LED light emission unit 70 is not to be particularly limited as long as lights of the three primary colors (red, green and blue) can be emitted and light emission amounts thereof can be arbitrarily changed. For example, one LED of each color may be provided, or a constitution in which light of the three primary colors can be emitted from a single chip may be used.

The camera 1 carries out AF control with a contrast detection system that adjusts focusing conditions of the photographing lens 21 on the basis of output from the imaging device 11. The LED light emission unit 70 emits an AF assist light when contrast detection is difficult, for example, when photographing in dark places and the like. When the LED light emission unit 70 is used as the AF assist light, the color of the assist beam that is emitted from the LED light emission unit 70 is controlled to a color that matches the spectral response characteristic of an AF light detection unit.

The power supply 80 supplies electrical power to the various electrical elements provided in the camera 1, such as the below-described ASIC 90 and so forth. The power supply 80 is detachably mounted in the camera 1. A battery chamber (not illustrated) for accommodating the power supply 80 is provided in the camera 1.

The ASIC 90 is an integrated circuit that supervises and controls the respective elements constituting the camera 1 described above. The ASIC 90 is provided with an photographing control unit 91 that controls photographing operations, a light emission control unit 92 that controls light emission operations by the LED light emission unit 70, and a display control unit 93 that controls display images displayed on the LCD monitor 60.

The above-described imaging device 11 also features the function of a photometry sensor. On the basis of outputs from the imaging device 11, the ASIC 90 performs automatic exposure (AE) control to set shutter speeds, photographing sensitivity, light emission amounts of the LED light emission unit 70 and the like for times of photographing.

Next, an example of a photographing environment when photographing is to be performed using the present embodiment of the camera, with the color (color temperature) of the illumination light being changed, is described.

Figure 3A:
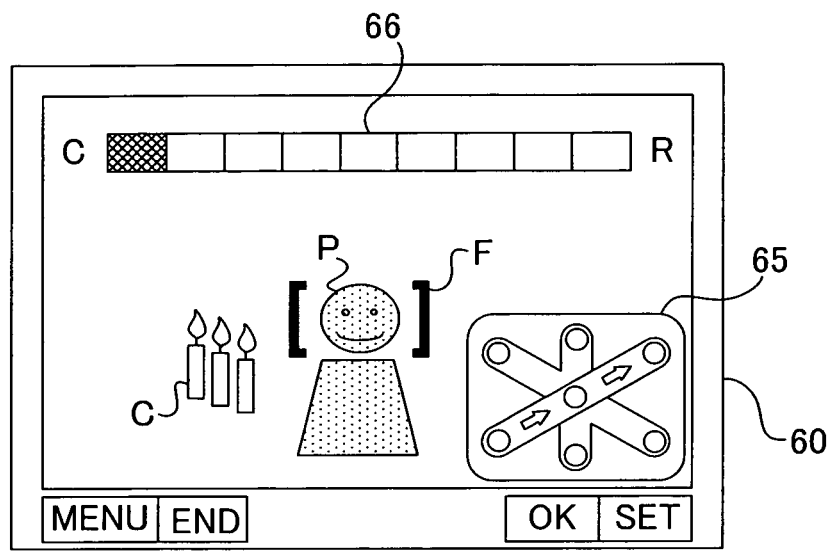
FIG. 3 is a diagram illustrating examples of a through-image that is displayed at an LCD monitor illustrated in FIG. 1.
Figure 3B:
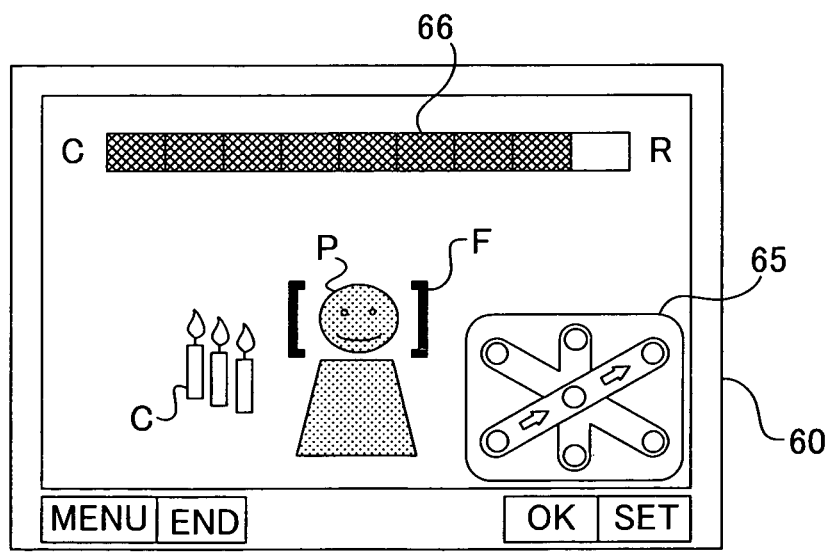

FIG. 3 is a diagram illustrating examples of a through-image that is displayed at the LCD monitor illustrated in FIG. 1. In FIGS. 3A ad 3B show cases in which the colors of the illumination light are different in substantially the same photographing environment.

In the photographing environment illustrated in FIG. 3, the principal object is a person P, and candles C are placed to illuminate this person P. In general, the flames of the candles C have a color temperature of around 1800 to 2000 K. This color is a warm color such as orange or the like. Therefore, if the person P is illuminated using, for example, a xenon tube, a white LED or the like, an image (photograph) that expresses the person P being illuminated by the flames of the candles C is difficult to photograph.

In such a case, if illumination light of a color approximately the same as the flames of the candles can be illuminated, then an image expressing the atmosphere of the photographing environment can be imaged. As methods for coloring illumination light, methods of, for example, installing a filter at an illumination device and the like have been considered. However, the installation takes time, in addition to which a filter of a suitable color is not always available.

In contrast, the camera 1 of the present embodiment performs control at the time of photographing to progressively change the color of the illumination light illuminated from the LED light emission unit 70 as time elapses. Herebelow, an photographing mode when the emission color of the LED light emission unit 70 is changed thus and photographing is performed is referred to and described as a "variable light emission color mode".

When photographing is carried out in the variable light emission color mode, the photographer can check the object image in the through-image displayed by the LCD monitor 60 and monitor the appearance with the color of the illumination light from the LED light emission unit 70 changing moment by moment as the time elapses. Then, at a moment at which the photographer thinks that the color of the illumination light is suitable, the photographer can execute an photographing operation at the camera 1, and thus image the object that is being illuminated by illumination light of the desired color. As well as photographing images that reflect the atmosphere of photographing locations as described above, the illumination light may be colored in order to image, for example, images with appearances that are not possible with illumination by natural light or white LEDs and that have interesting moods or artistic effects.

Further, the LED light emission unit 70 has a plural number of light emission patterns available for selection for when the color of the illumination light is being changed.

FIG. 4 is a graph illustrating examples of the light emission patterns from the LED light emission unit that is provided in the camera illustrated in FIG. 1. The horizontal axis represents time and the vertical axis represents the light emission color of the LED light emission unit.

Figure 4A:
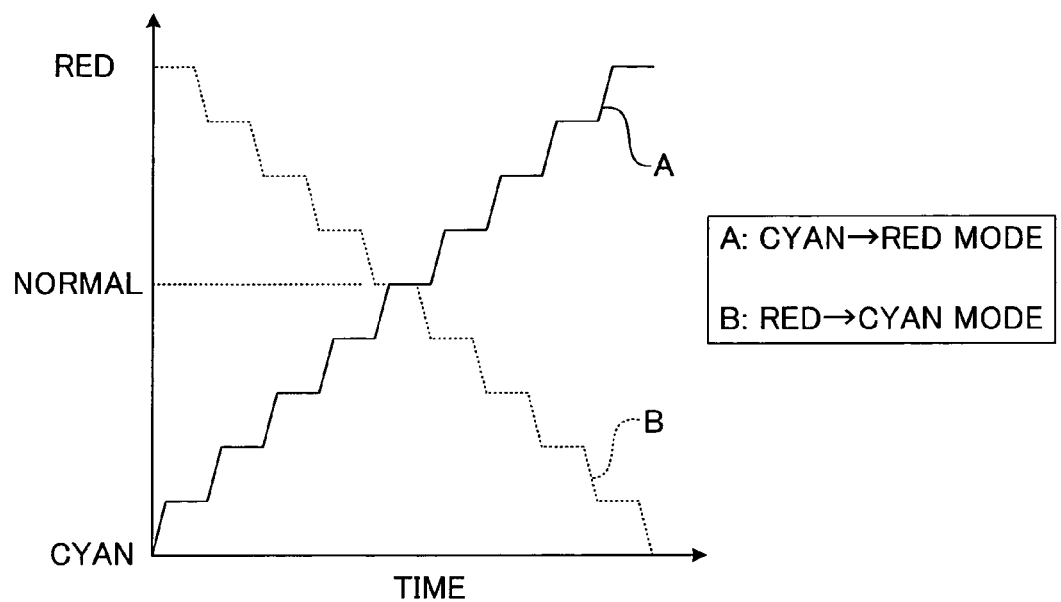
FIG. 4 is a graph illustrating examples of light emission patterns from an LED light emission unit illustrated in FIG. 1.

Graph A in FIG. 4A illustrates the changing of the light emission color in a mode in which the light emission color is changed from cyan to red, the complementary color thereof, via white (normal), which is a reference color. Graph B illustrates the changing of the light emission color in a mode in which the light emission color is changed from red via white (normal) to cyan.

If the light emission light is to be changed from cyan to red as in graph A, the light emission control unit 92 first illuminates the blue and green LEDs with a ratio of 1:1 (R,G,B)= (0,255,255), and generates the cyan light that is the combination thereof. Thereafter, the light emission control unit 92 adds a red light component, continuously changes the tone of the color by progressively increasing the ratio of the red light, and progressively brings the light emission color closer to white (normal). When the illumination amounts of the red, green and blue LEDs are equal (R,G,B)=(255,255,255), the LED light emission unit 70 is emitting white light.

Thereafter, the light emission control unit 92 continuously changes the tone of the color by progressively reducing the green and blue color components, and progressively brings the light emission color toward red. When the LED light emission unit 70 is emitting red illumination light, only the red LED is being used (R,G,B)=(255,0,0). The light emission control unit 92 controls the light emission amounts of the respective LEDs such that, even though the number of LEDs being used changes when the light emission color is being changed, the light emission amount (light emission intensity) of the illumination light that is illuminated from the LED light emission unit 70 is substantially constant.

Moreover, the configuration of the light emission control circuit of the LED light emission unit 70 of the present embodiment is such that the light emission amounts change stepwise at intervals of a predetermined duration as illustrated in FIG. 3. However, a light emission amount control circuit and a light emission control program may be tuned such that the color of the illumination light appears to change smoothly.

The LED light emission unit 70 can also arbitrarily adjust the speed and range of change of the color of the illumination light.

Figure 4B:
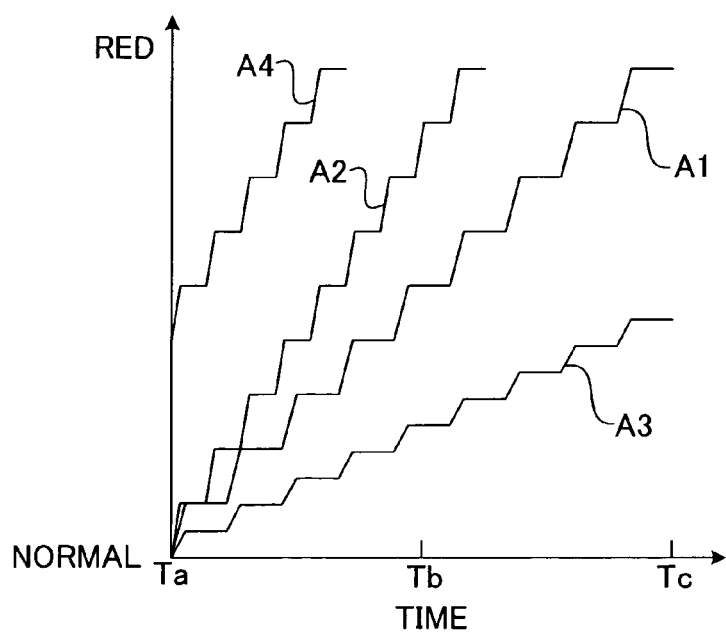

The graph of FIG. 4B illustrates examples of light emission patterns with different change ranges of the light emission color and change speeds of the light emission color.

The light emission patterns of graph A1 and graph A2 are the same in starting the illumination of the illumination light at white (normal) and changing to red as time elapses. However, the color of the illumination light reaches red in a shorter time in graph A2. The light emission pattern of graph A3 starts from white, the same as the light emission pattern of graph A1, but the final color of the illumination light is a color between white and red (dark pink).

Unlike the other light emission patterns, the color of the illumination light at the start of light emission in the light emission pattern of graph A4 is not white but starts with light emission at, for example, a color between white and red (dark pink). With the light emission patterns of the examples described above, cases are described that start from cyan or white and change to red. However, the camera 1 of the present embodiment has available other light emission patterns in which the color is changed between two colors with a complementary relationship, for example, from red to cyan, from yellow to blue, from blue to yellow, from magenta to green, from green to magenta and so forth. The photographer can additionally select a light emission pattern such that the light emission color is changed between two unrelated colors (for example, red and blue).

In addition to the light emission mode described above that changes the tone of the illumination light color continuously (a continuous change mode), the LED light emission unit 70 of the present embodiment is provided with a light emission mode that, when photographing is performed in the variable light emission color mode, changes the illumination light color non-continuously. In this case, for example, the color of the illumination light is controlled to change directly from one color to another color (a direct change mode). A time lag when switching between colors, because the changes of color are implemented by control of currents, can be disregarded in practice and the illumination light can be illuminated continuously.

Figure 5:
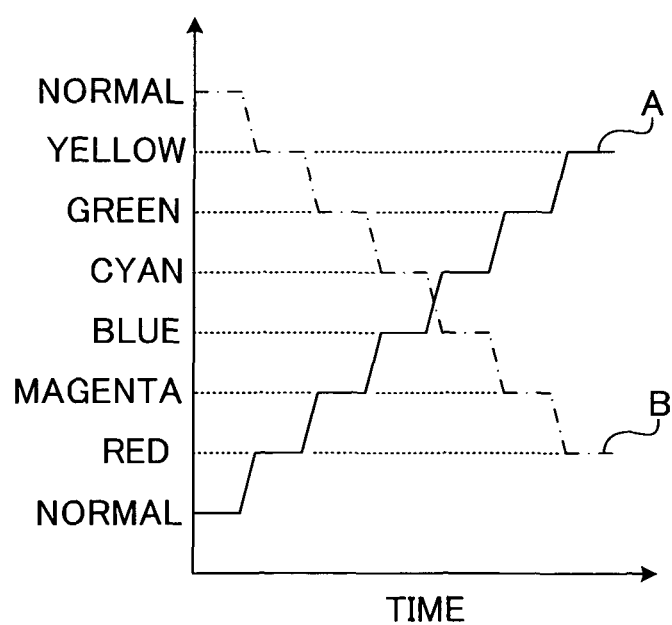
FIG. 5 is a graph illustrating another example of light emission patterns from the LED light emission unit illustrated in FIG. 1.

FIG. 5 is a graph illustrating another example of light emission patterns of the LED light emission unit provided in the camera illustrated in FIG. 1. The horizontal axis represents time and the vertical axis represents the light emission color of the LED light emission unit.

In the light emission patterns illustrated in FIG. 5, light emission is sequentially performed for a total of seven colors, lights of the three colors constituting the three primary colors of the light (red, green and blue), lights of the three colors that are complementary colors thereof (cyan, magenta and yellow), and white light (normal).

In the example illustrated by graph A of FIG. 5, white light is emitted immediately after the start of light emission, then red, magenta, blue, cyan, green and yellow are emitted in this order. In the light emission pattern illustrated by graph A, the light emission sequence after white follows the sequence of arrangement in the anticlockwise direction of a "hue circle". Here, light emission durations of the respective colors are set to be substantially the same.

The photographer can check appearances with the illumination light color changing, in the through-image, and operate the release button 32 to perform photographing at the moment when a desired color is reached.

In the example illustrated by graph B of FIG. 5, white light is emitted immediately after the start of light emission, then yellow, green, cyan, blue, magenta and red are emitted in this order. In the light emission pattern illustrated by graph A, the light emission sequence after white follows the sequence of arrangement in the clockwise direction of the "hue circle". Light emission sequences of the colors are not to be limited to the sequences illustrated by graph A and B in FIG. 5; the photographer may specify a suitable light emission sequence of the colors. Moreover, light may be emitted using colors other than the three primary colors and their complementary colors (and there may be fewer than the above-mentioned seven colors or more than the above-mentioned seven colors).

In which light emission mode (the continuous change mode or the direct change mode) the light is to be emitted at the time of photographing, and which colors are to be used in the respective light emission mode, are set manually by the photographer or automatically by the ASIC 90 on the basis of output from the imaging device 11.

If the ASIC 90 sets the light emission pattern on the basis of output from the imaging device 11, the ASIC 90 determines a distribution of colors in the whole image from image data generated on the basis of the output from the imaging device 11, and selects the most suitable light emission pattern. For example, in the example illustrated in FIG. 3, the person P is illuminated by the flames of the candles C (a warm color with a color temperature of around 2000 K). Therefore, the ASIC 90 selects a light emission pattern that includes a color similar to that color (for example, in this case, a continuous change mode that changes from cyan to red via white). If plural colors are mixed up in the overall image, light emission of the illumination light may be controlled in the direct change mode.

If the photographer selects the light emission mode and the colors to be used (hereinafter referred to as the light emission pattern) manually, the photographer makes a setting using a menu screen displayed on the LCD monitor 60.

FIG. 6 is a menu screen for light emission pattern setting that is displayed at the LCD monitor illustrated in FIG. 1.

As illustrated in FIG. 6, the menu screen for light emission pattern setting displayed at the display screen of the LCD monitor 60 has white (N), which is the reference for all colors, at the middle and a plural number (six in the present embodiment) of strip regions arranged radiating from the middle. These strip regions correspond to the colors red (R), magenta (M), blue (B), yellow (Y), green (G) and cyan (C). This menu screen is displayed in color on the LCD monitor 60, with distal end portions of the strip regions being colored with the respectively corresponding colors and intermediate portions of the strip regions being displayed with gradations.

In the state in which the menu screen shown in FIG. 6 is displayed on the LCD monitor 60, the photographer operates the various switches included in the operation unit 30 and sets the light emission pattern. More specifically, the photographer sets which of the continuous change mode and the direct change mode to use, and then designates the colors to be used (the first color, an intermediate color and the last color, or the like).

Figure 6A:
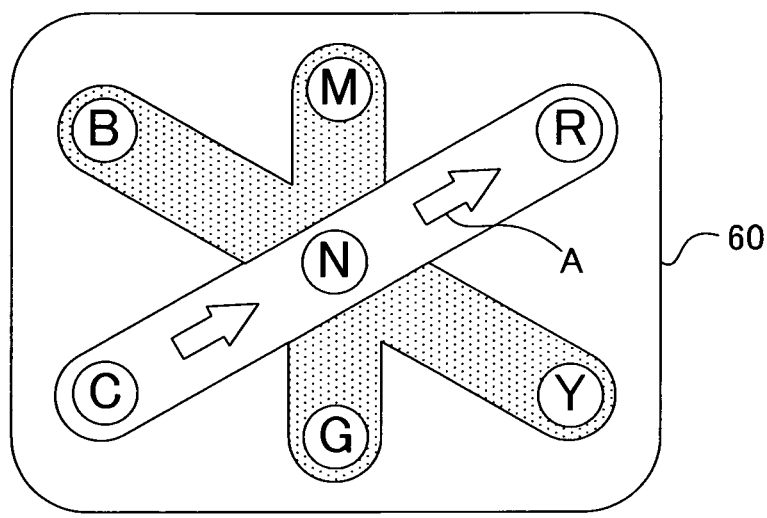
FIG. 6 is a diagram illustrating examples of a menu screen for light emission pattern selection that is displayed at the LCD monitor illustrated in FIG. 1.

FIG. 6A illustrates the display screen when, for example, a light emission pattern is selected that, in the continuous change mode, progressively changes the light emission color from cyan through white to red. In this case, the strip regions corresponding to the colors magenta, blue, green and yellow that are not to be used at the time of photographing are distinguished from the strip regions corresponding to cyan and red by, for example, coloring, patterning or the like.

Figure 6B:
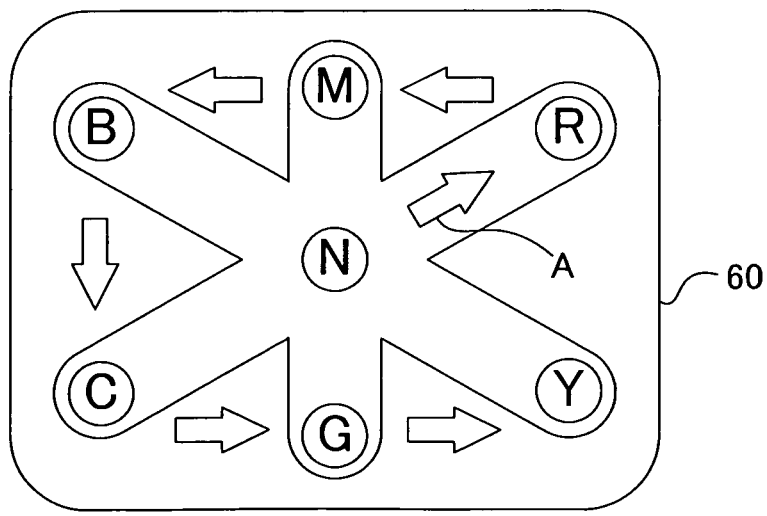

FIG. 6B illustrates the display screen when, for example, a light emission pattern is selected that, in the direct change mode, starts from white and changes in the sequence red, magenta, blue, cyan, green, yellow. Arrows A that indicate the sequences of change of the light emission colors are displayed in the menu screen for the respective light emission pattern settings.

When the colors to be used in light emission are being selected, they are not to be limited to the seven colors mentioned above and colors between those colors may be specified.

Figure 7:
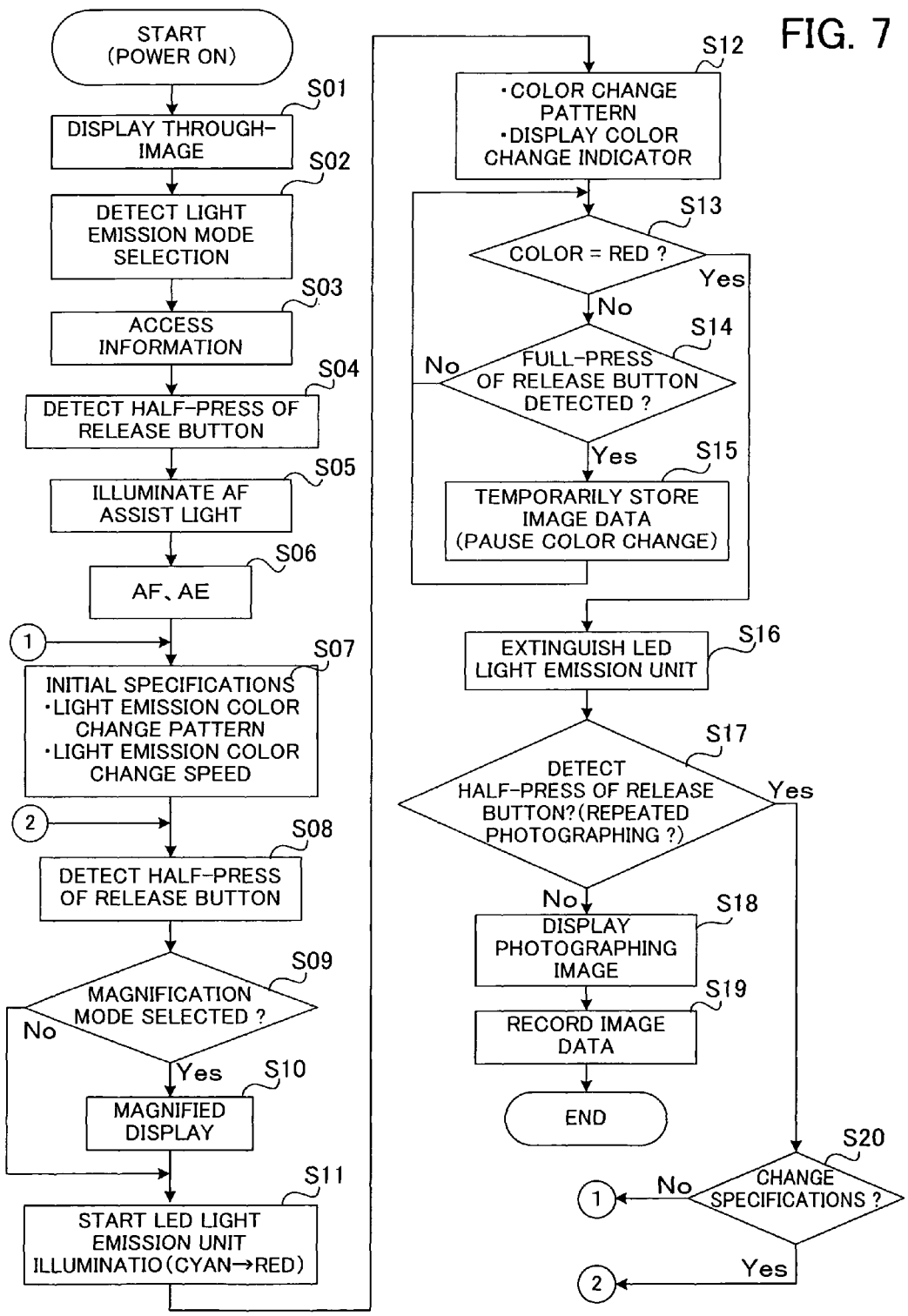
FIG. 7 is a flowchart illustrating control that is performed by an ASIC at the time of photographing.

Next, photographing control, light emission control, display control and the like, which are carried out by the ASIC 90 when photographing is carried out using the camera 1 of the embodiment, are described step-by-step using the flowchart illustrated in FIG. 7.

FIG. 7 is a flowchart illustrating the control performed by the ASIC illustrated in FIG. 2 at the time of photographing.

(Step S01: Display Through-Image)

When the ASIC 90 senses the turning-on operation of the power switch 31, the ASIC 90 performs control to open the shutter 22 provided at the lens barrel 20 and drives the imaging unit 10.

The ASIC 90 causes the through-image to be displayed on the LCD monitor 60 on the basis of outputs from the imaging unit 10, and proceeds to step S02.

The photographer carries out framing while checking the through-image.

(Step S02: Detect Light Emission Mode Selection)

The ASIC 90 causes a menu screen (not illustrated) for selecting a light emission mode of illumination light at the time of photographing to be displayed on the LCD monitor 60. As light emission modes for illumination light, for example, a flash light emission mode that causes a flash to be emitted, a light emission color change mode that changes the color of the illumination light as time elapses with the light amount being constant, and the like are prepared.

If the light emission color change mode is selected by the photographer, the ASIC 90 then proceeds to step S03. A method of selection of the light emission mode is not to be limited to this. For example, a dedicated push-button may be provided.

In combination with the selection of the light emission mode, the photographer sets whether the light emission color change pattern and change speed are to be specified manually (manual specification mode) or are to be specified automatically by the ASIC 90 in accordance with photometry results in step S06 described below (automatic specification mode).

(Step S03: Access Light Emission Color Control Information)

The ASIC 90 accesses the light emission color control information stored in the memory 50, and proceeds to step S04. The light emission color control information includes data that the light emission control unit 92 refers to when setting various parameters relating to light emission colors in step S07, described below.

(Step S04: Detect Half-Press of Release Button)

When the ASIC 90 detects a half-press operation of the release button 32 by the photographer, the ASIC 90 proceeds to step S05.

(Step S05: Illuminate AF Assist Light)

The light emission control unit 92 of the ASIC 90 controls the LED light emission unit 70 and the AF assist light is emitted, and the ASIC 90 proceeds to step S06.

However, if emission of the AF assist light is disallowed by the photographer, or if an photographing mode in which emission of the AF assist light is not required is selected (for example, a landscape photographing mode or the like), or the like, then step S05 is skipped and the AF assist light is not illuminated.

(Step S06: AF, AE)

The ASIC 90 implements publicly known contrast detection-type AF control, moving a portion of the photographing lens 21 (a focusing lens) in the optical axis direction and detecting a lens position at which the contrast of the object image in a pre-specified AF area F (see FIG. 3) is highest.

The ASIC 90 also implements AE control, for example, acquiring object luminance information at photometry points provided in the vicinity of the AF area F on the basis of outputs from the imaging unit 10, and setting the shutter speed, imaging sensitivity and the like on the basis of this luminance information (and proceeds to step S07). A configuration such that AF control and AF control are continuously performed during framing regardless of the half-press operation of the release button 32 in step S04 is also possible.

(Step S07: Initial Specifications)

If the automatic specification mode is selected in step S02, the ASIC 90 sets the light emission color change pattern and the light emission color change speed of the LED light emission unit 70 on the basis of the photometry results obtained in step S05 (and proceeds to step S08). However, if the manual specification mode is selected, the ASIC 90 sets the light emission color change pattern and the light emission color change speed in accordance with inputs by the photographer.

As described above, a number of light emission patterns are prepared beforehand for the LED light emission unit 70. If the automatic specification mode is selected in step S02, the light emission control unit 92 selects a suitable light emission pattern from the prepared light emission patterns on the basis of the photometry results.

Hereinafter in the present embodiment, as an example, a case in which a continuous change mode that changes the light emission color from cyan through white to red is described. Information relating to these light emission patterns is included in the light emission color control information stored in the memory 50. Even if the automatic specification mode is selected, the photographer may amend the light emission pattern (change pattern and change speed) specified by the light emission control unit 82 by manual inputs. For example, when photographing a plural number of images, if color differences between the plural images are to be made smaller, this photographing can be carried out more easily if the illumination light color change speed is made slower than usual.

(Step S08: Detect Half-Press of Release Button)

When the ASIC 90 detects that a further half-press operation of the release button 32 has been detected, the ASIC 90 proceeds to step S09. If a half-press operation of the release button 32 is not detected within a predetermined duration after the initial specification in step S07, control passes to step S11 and the illumination of illumination light by the LED light emission unit 70 begins. In this case, the LED light emission unit 70 starts the emission of the illumination light directly after the illumination of the AF assist light ends.

(Step S09: Confirm Magnification Mode Selection)

The ASIC 90 displays a selection screen on the LCD monitor 60 and enquires to the user as to whether or not to display a portion of the through-image magnified.

If the photographer selects a magnification mode, the ASIC 90 proceeds to step S10, described below, and the display control unit 93 accordingly magnifies the display of part of the through-image. If the photographer does not select the magnification mode, control passes to step S11, described below.

(Step S10: Magnify Display Screen)

When a magnified display mode is selected, the display control unit 93 performs processing to magnify display of the image of a predetermined region within an image screen, for example, an image in a predetermined range containing the AF area F.

FIG. 8 is a diagram illustrating examples of a magnified display of the through-image that is displayed at the LCD monitor illustrated in FIG. 1.

Figure 8A:
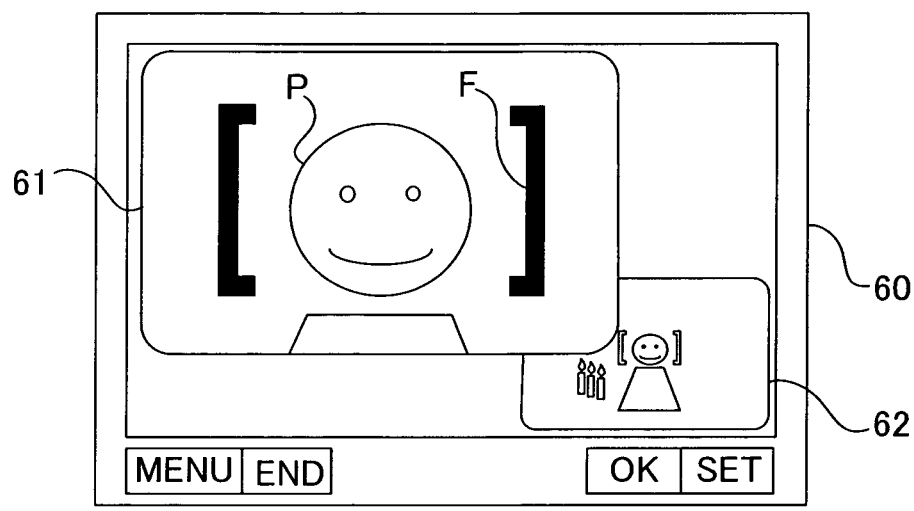
FIG. 8 is a diagram illustrating examples of a magnified display of the through-image that is displayed at the LCD monitor illustrated in FIG. 1.
Figure 8B:
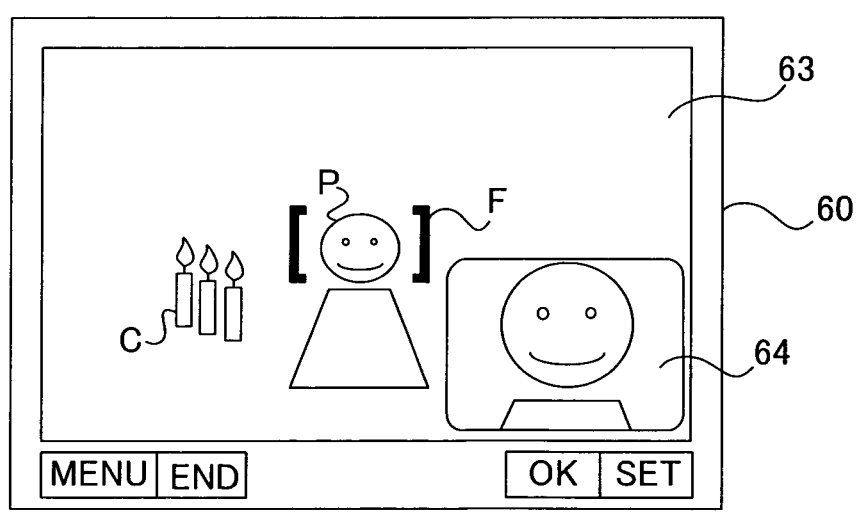

In FIG. 8, FIG. 8A illustrates a display screen in which a magnified display image and an overall display screen (with a magnification ratio of 1) are displayed separately, and FIG. 8B illustrates a display screen in which a magnified display screen and an overall display screen are displayed superimposed.

In the display screen illustrated in FIG. 8A, a portion containing the AF area F (the portion with the face of the person P) is displayed magnified at a pinpoint. As illustrated in FIG. 8A, this magnified display screen 61 is displayed using about three-quarters of the image display region of the LCD monitor 60, and the whole object image (the whole through-image) is displayed reduced in another region 62 (and control passes to step S11).

The size of the region 62 is smaller than the size of the magnified display screen 61.

By selecting this magnified display mode, the photographer can check the object in detail at the portion of the object defined by the AF area F (the portion that is being focused on).

In the display screen illustrated in FIG. 8B, a display window 64 for magnified display is displayed superimposed within (on top of) an image 63 that is displayed in a full display mode, and a magnified display of the portion containing the AF area F is displayed in this display window 64.

Which of the magnified display modes illustrated in FIG. 8A and FIG. 8B is to be used can be switched by the photographer in the state in which the through-image is being displayed.

(Step S11: Start Illumination)

The light emission control unit 92 of the ASIC 90 controls the LED light emission unit 70 and starts the illumination of illumination light at the object P, and the ASIC 90 proceeds to step S12. Even if a half-press operation of the release button 32 is not detected in step S04 or step S08, the light emission control unit 92 starts illumination light emission control with the LED light emission unit 70 (the control from step S11 onward) when a pressing operation of the light emission start button 36 is detected.

From step S11 until the LEDs are extinguished in step S16, described below, the light emission control unit 92 continues to illuminate continuous light from the LEDs while progressively changing the light emission color of the illumination light illuminated from the LED light emission unit 70 as time elapses, for example, from cyan to red (i.e., while changing the light emission color by changing the currents applied to the LEDs). However, the LED light emission unit 70 does not change the light emission color (i.e., holds the light emission color) for a moment during imaging (recording) of the object image by the imaging device 11 in step S15, described below.

The present step S11 is executed when a half-press of the release button is detected in step S08. In other words, step S11 is executed in response to a half-press operation of the release button 32 by the user.

(Step S12: Display Color Change Pattern and Color Change Indicator)

The ASIC 90 causes the display control unit 93 to display a light emission color change pattern 65 and an indicator 66 representing a state of change on the LCD monitor 60 as illustrated in FIG. 3 (and proceeds to step S13).

As illustrated in FIG. 3, the colour change pattern 65 is similar to the menu screen for light emission pattern setting illustrated in FIG. 6, and is displayed in a portion (for example, the bottom-right corner) of the display screen of the LCD monitor 60.

As illustrated in FIG. 3, the indicator 66 has the form of a bar graph (strip graph) that represents states of change from the initial color to the final color of the color changes corresponding to the selected light emission mode. For example, portions of the indicator 66 change color as the light emission color changes.

By checking the indicator 66, the photographer can understand, for example, how far the current illumination light color is from the reference white color, how much more the color of the illumination light can be changed before the illumination light reaches the final red color, and the like.

(Step S13: Determine Color)

The ASIC 90 carries out the light emission color change control starting from step S11 and the display control starting from step S12, and determines whether or not the light emission color of the LED light emission unit 70 has reached the color specified in step S07 (for example, red in the present embodiment). Specifically, the ASIC 90 determines the ratios of the light emission amounts of the three LEDs and determines whether or not the light emission amount of the red LED is 100%, accounting for all of the illumination light ((R,G,B)=(255,0,0)). While the light emission color has not reached red, control passes to step S14, and when the light emission color reaches red, control passes to step S16.

(Step S14: Detect Full-Press of Release Button)

When the ASIC 90 detects the full-press operation of the release button 32, the light emission color change control that has been carried out since step S11 is temporarily paused (the light emission color of the LED light emission unit 70 is maintained from the moment of the full-press), and the ASIC 90 proceeds to step S15. While the full-press operation of the release button 32 is not detected, control returns to step S13 and the subsequent processing is repeated.

(Step S15: Temporarily Store Image Data)

The photographing control unit 91 of the ASIC 90 starts the photographing operation in response to the full-press operation of the release button 32. Specifically, the imaging unit 10 starts to accumulate object light from that moment. When the shutter 22 closes and the accumulation finishes, the imaging unit 10 converts the light to electronic signals by optoelectronic conversion and outputs the same to the ASIC 90. An unillustrated image processing unit of the ASIC 90 generates image data on the basis of these electronic signals.

The ASIC 90 writes to the memory 50 and stores this image data, and then the ASIC 90 resumes the illumination light color change control of the LEDs, returns to step S13, and repeats the subsequent processing. Therefore, repeated photographing can be performed by full-press operations of the release button 32 until the color of the illumination light illuminated from the LED light emission unit 70 reaches red. Even when this repeated photographing is performed, the color of the illumination light continues to change continuously after photographing (with the light emission color being constant within the individual images). Therefore, the plural images that are imaged will be images with respectively different colors of illumination light on the object. Thus, by repeating the processing from step S13 to step S15, the camera 1 can perform "bracketing photographing" with different colors of illumination light in the respective images.
(Step S16: Extinguish LED Light Emission Unit)

When it is determined in step S13 that the illumination light color has reached red, the light emission control unit 92 ends (extinguishes) the illumination of illumination light by the LED light emission unit 70, and proceeds to step S17.
(Step S17: Determine Photographing Repetition)

The camera 1 is configured to perform repeated photographing in the light emission color change mode in response to a half-press operation of the release button 32 by the photographer. If, after the LED light emission unit 70 is extinguished in step S16, the ASIC 90 detects the half-press operation of the release button 32 before a predetermined duration has elapsed, the ASIC 90 then proceeds to step S20 (described below) and performs successive photographing control.

On the other hand, if the half-press operation of the release button is not detected before this predetermined duration has elapsed, the ASIC 90 then proceeds to step S18.
(Step S18: Display Photographed Image)

The ASIC 90 displays the image data stored in the memory 50 in step S15 on the LCD monitor 60 as a photographed image. If there are plural sets of image data that have been imaged with different illumination light emission colors, the ASIC 90 displays photographed images based on these sets of image data as thumbnails, and proceeds to step S19. If the full-press operation of the release button 32 (step S14) is not detected while the illumination light is illuminating (i.e., if there is no photographed image data), the ASIC 90 skips step S18 and the following step S19, and ends the processing.
(Step S19: Record Image Data)

The ASIC 90 records image data selected by the photographer from the photographed images displayed on the LCD monitor 60 in step S18 to the card 40, and ends the processing.
(Step S20: Confirm Specification Changes)

The ASIC 90 displays a confirmation screen for whether or not to change specifications on the LCD monitor 60, and enquires to the photographer as to whether or not to make changes from the initial specifications specified in step S07. If the photographer makes a selection to the effect of not changing the specifications (photographing again with the same parameters), control returns to step S08, and the ASIC 90 performs the light emission color change control again with the parameters specified in step S07.

On the other hand, if the photographer makes a selection to the effect of changing the specifications, the ASIC 90 then returns to step S07 and displays the specification screen on the LCD monitor 60. The photographer re-specifies the light emission color change pattern and change speed manually in the specification screen, and carries out photographing again.

At this time, rather than the manual specification, photometry may be performed again (returning to step S06) and the light emission color change pattern set automatically.

According to the first embodiment of the camera described above, the following effects may be provided.

(1) Because the color of the illumination light emitted by the LED light emission unit 70 changes as time elapses, the photographer can image the object being illuminated with illumination light of a desired color by operating the release button 32 at a moment at which the color of the illumination light is the desired color. Therefore, images that reflect the atmosphere of photographing environments can be imaged, images with appearances that would not be possible with natural light or white light can be easily imaged, and so forth.

(2) Because the color of the illumination light changes in real time during framing, photographing can be promptly performed at the moment at which the color of the illumination light is the desired color.

(3) Because the state of change of the light emission amount is displayed by the indicator 66, the photographer can predict how the color of the illumination light will change subsequently, and can easily ascertain timing for starting the photographing operation.

(4) In the continuous change mode, because the light emission color changes between a primary color and a complementary color as time elapses, control is simple.

(5) Because plural images with different illumination effects (bracketing photographing) can be photographed by performing a plural number of full-press operations of the release button 32 while the illumination light emission color is changing, the likelihood of being able to take photographs that are illuminated with favored colors is high.

(6) The light emission color change pattern and change speed can be both arbitrarily specified by manual operations and automatically specified by the ASIC 90 on the basis of photometry results, which is convenient.

(7) The light emission color change speed can be specified to an arbitrary value. Therefore, for example, if the light emission amount change speed is slowed, it is easy for a photographer to perform photographing with a desired light emission color without losing a shooting opportunity.

(8) The light emission color change span can be arbitrarily specified. Therefore, for example, an photographing time can be shortened by the light emission color being changed only near a desired color.

(9) Because the region corresponding to the AF area F is displayed magnified in the through-image during framing, the illumination condition of the object at the position that is being focused on can be checked in detail.

Second Embodiment

Next, a second embodiment of the camera including an illumination device for photographing that employs the present invention is described. In the second embodiment, portions that fulfill functions the same as in the first embodiment described above are assigned the same reference numerals or reference numerals with the same suffixes, and duplicative descriptions and illustrations are omitted as appropriate.

A camera 101 of the second embodiment is provided with the same structure as the camera 1 of the first embodiment, and is described with the parenthesized numerals in FIG. 1 and FIG. 2 assigned thereto.

Similarly to the camera 1 of the first embodiment, the camera 101 of the second embodiment performs control to change the color of illumination light that is emitted by the LED light emission unit 70 at the time of photographing. The camera 101 of the second embodiment performs control to change the light emission color (a first loop) and, upon reaching the final color specified for the light emission color (red in the above-described first embodiment), automatically repeats the control to change the light emission color (a second loop).

That is, the camera 101 of the second embodiment accepts an photographing reservation in accordance with a full-press operation of the release button 32 by the photographer during the first loop of light emission, and starts the photographing operation at a point in time during the second loop of light emission control at which the light emission color of the LED light emission unit 70 is substantially the same as the light emission color at the time of receiving the reservation.

The camera 101 of the second embodiment also executes respective photographing operations at a timing earlier than the timing at which the light emission color is the same as that at the time of receiving the reservation, and a timing later than the same. Thus, in addition to an image in which the object is illuminated with illumination light of a color desired by the photographer, the camera 101 automatically photographs two images with different colors of illumination light from that image.

The camera 101 of the second embodiment also automatically performs a third loop of light emission after the second loop of light emission. In the third loop of light emission, the color of the illumination light is fixed at the same color as the color reserved in the first loop, and control is performed to progressively increase the light emission amount as time elapses. Photographing is automatically performed respectively at a timing before reaching an appropriate light emission amount, which has been set by AE control in the first loop, and later than a timing at which this appropriate light emission amount is reached.

Thus, as the two images of the second loop (images with both light emission color and light emission amount the same as at the input of the reservation), the camera 101 of the second embodiment photographes two images with the same illumination light color and different light emission amounts. Herein, the control to progressively increase the light emission amount of the LED light emission unit 70 is implemented by controlling current values applied to the LEDs.

Herebelow, control that is carried out by an ASIC 190 provided at the camera 101 of the second embodiment at the time of photographing is described.

Figure 9:
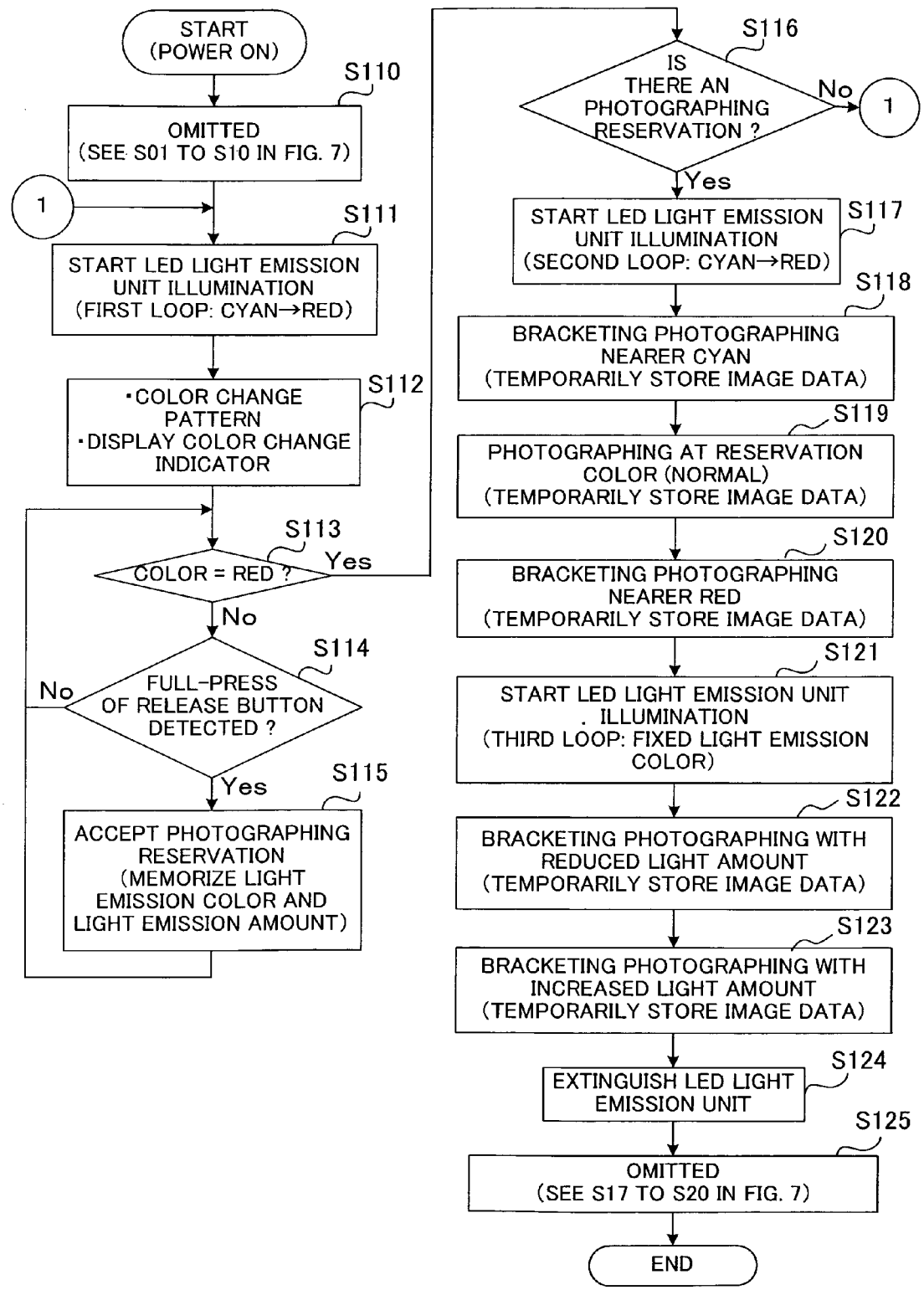
FIG. 9 is a flowchart illustrating control that is performed at the time of photographing by an ASIC provided at a camera of a second embodiment.

FIG. 9 is a flowchart illustrating the control that is performed at the time of photographing by the ASIC 190 provided at the camera 101 of the second embodiment.

The control that is performed by the ASIC 90 of the first embodiment from step S01 to step S10 is performed in the same manner by the ASIC 190 of the second embodiment, so is not described here. Subsequent processing is described.

A light emission control unit 192 of the ASIC 190 controls the LED light emission unit 70 in response to a half-press operation of the release button 32 and causes illumination light to be illuminated at the object (step S111). The ASIC 90 carries out the light emission color control of the LED light emission unit 70, while a display control unit 193 causes the color change pattern 65 and the indicator 66 representing the state of change of the light emission color (see FIG. 3) to be displayed on the LCD monitor 60 (step S112).

By monitoring the object being illuminated by the LED light emission unit 70 (the through-image) with the LCD monitor 60 and performing a full-press operation of the release button 32 at the moment when the color of the illumination light is a desired color, the photographer sends an photographing reservation signal to the ASIC 190.

When the ASIC 190 detects the full-press operation of the release button 32 ("yes" in step S114), the ASIC 190 accordingly accepts the photographing reservation. When the ASIC 190 accepts the photographing reservation, the ASIC 190 records, in the memory 50, the light emission color of the LED light emission unit 70 (i.e., the current values for the LEDs) at the moment at which the full-press operation of the release button 32 is performed (step S115).

This photographing reservation may be performed repeatedly (a plural number of times) up until the color of the LED light emission unit 70 reaches the final color (red in the example of the first embodiment).

Herebelow, as an example, a case is described in which an photographing reservation is performed while the light emission color is being changed from cyan through normal to red.

Figure 10:
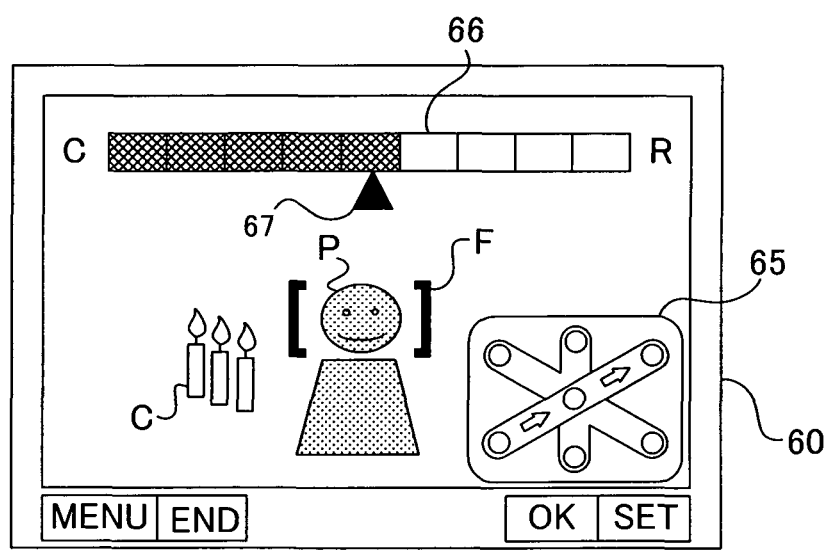
FIG. 10 is a diagram illustrating an example of a display screen that is displayed at an LCD monitor provided at the camera of the second embodiment.

FIG. 10 is a diagram illustrating a display screen that is displayed at the LCD monitor when an photographing reservation is received in the camera of the second embodiment.

When an photographing reservation is made (the full-press operation of the release button 32) during the first loop of light emission, for example, a triangular reservation mark 67 is displayed at the LCD monitor 60 together with the indicator 66. The indicator 66 illustrated in FIG. 10 indicates at which color the photographing reservation was accepted. In the case in FIG. 10, the indicator 66 indicates that the photographing reservation was made when the light emission color was approximately at normal. If a plural number of photographing reservations are made, a plural number of the reservation mark 67 are displayed.

When the light emission color of the LED light emission unit 70 reaches red (the final color), the ASIC 190 determines whether or not there is a photographing reservation (step S116). If there is no photographing reservation, the ASIC 190 returns to step S111, starts the light emission of the LED light emission unit 70 (the first loop) again, and waits for the input of an photographing reservation signal.

However, if there is an photographing reservation, the ASIC 190 starts the second loop of light emission from the LED light emission unit 70 (step S117).

The ASIC 190 carries out the second loop of light emission control, and automatically performs bracketing photographing with illumination light colors that are offset from the time of photographing. The second loop of light emission may start from cyan, the same as in the first loop, or may start from a color close to the light emission color at the time of the photographing reservation. In the latter case, the duration of photographing is shorter.

For example, when photographing is performed in response to the first reservation (approximately normal), the ASIC 190 starts the first photographing operation when the color is some way from normal (white) toward cyan (i.e., a slightly bluish white), and the ASIC 190 saves the image data generated by this photographing operation to the memory 50 (step 118). When this bracketing photographing is to be performed, how far the light emission color is offset from the light emission color of the reservation time may be specified arbitrarily.

The ASIC 190 also starts respective photographing operations at the moment at which the light emission color of the LED light emission unit 70 is substantially the same as the light emission color at the time of accepting the reservation (approximately normal) (step 119), and a moment at which the color is some way toward red from the light emission color at the time of accepting the reservation (i.e., a slightly reddish white) (step S120). The ASIC 190 saves the image data generated by these photographing operations to the memory 50. If plural photographing reservations are specified, the ASIC 190 returns to step S117 and performs bracketing photographing for each of the photographing reservations.

When the ASIC 190 has completed the bracketing photographing with the offset light emission colors, the ASIC 190 starts the third loop of light emission (S121).

This third loop of light emission fixes the light emission color at the light emission color of the time of accepting the reservation. In this third loop of light emission, the ASIC 190 changes the light emission amount of the illumination light as time elapses, and images (steps S122 and S123) an image with a light amount that is reduced (with a hint of underexposure) relative to the light emission amount at the time of the photographing reservation (i.e., the light emission amount set by the AE) and an image with an increased light amount (with a hint of overexposure). If a plural number of reservations have been made, the processing returns to step S121 and performs bracketing photographing in the same manner.

Thus, in the camera of the second embodiment, for a single photographing reservation, a total of five images are photographed: one image (a reference image) with conditions the same as at the time at which the photographing reservation was made, two images with the same light emission amount but different light emission colors from the reference image, and two images with the same light emission color but different light emission amounts from the standard image.

Thereafter, the ASIC 190 ends light emission from the LED light emission unit 70 (step S124) and displays the images imaged by the bracketing photographing at the LCD monitor 60 (see step S18 in FIG. 7). The photographer inspects the plural images, selects a desired image, and causes the same to be recorded to the card 40.

Because the camera 101 of the second embodiment described above accepts the photographing reservation in the first loop and performs photographing in the second loop, in the first loop the photographer can concentrate on setting the color of the illumination light to be illuminated at the object rather than on setting the image composition. Then, in the second loop, because the photographing is automatically started at the moment at which the illumination light is the same color as specified in the first loop, the photographer can concentrate on setting the image composition.

Thus, with the camera 101 of the second embodiment, the photographer can perform the work of setting the light emission color and the work of setting the image composition separately, and user-friendliness is improved.

Moreover, even if the timing of actually inputting the reservation (the full-press operation of the release button 32) is offset from the timing of the desired color, because images in which the light emission color is offset are automatically imaged in the second loop, the possibility of being able to obtain an image illuminated with illumination light of the desired color is high.

Further still, images with both underexposure and overexposure relative to the images that are imaged with the light emission amount set on the basis of the AE control are automatically imaged in the third loop. Therefore, the possibility of being able to image an image with an appropriate exposure is high.

Third Embodiment

Figure 11A:
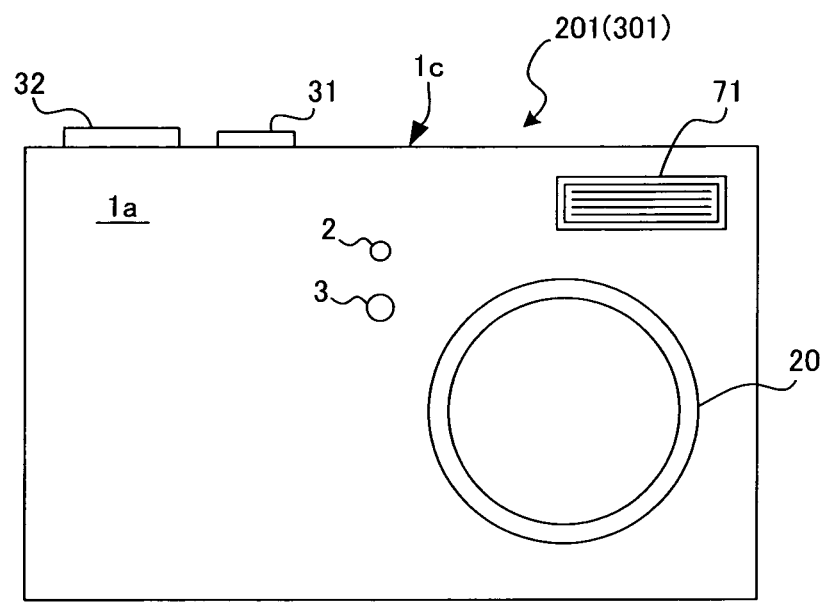
FIG. 11 is an exterior view of a camera of a third embodiment.
Figure 11B:
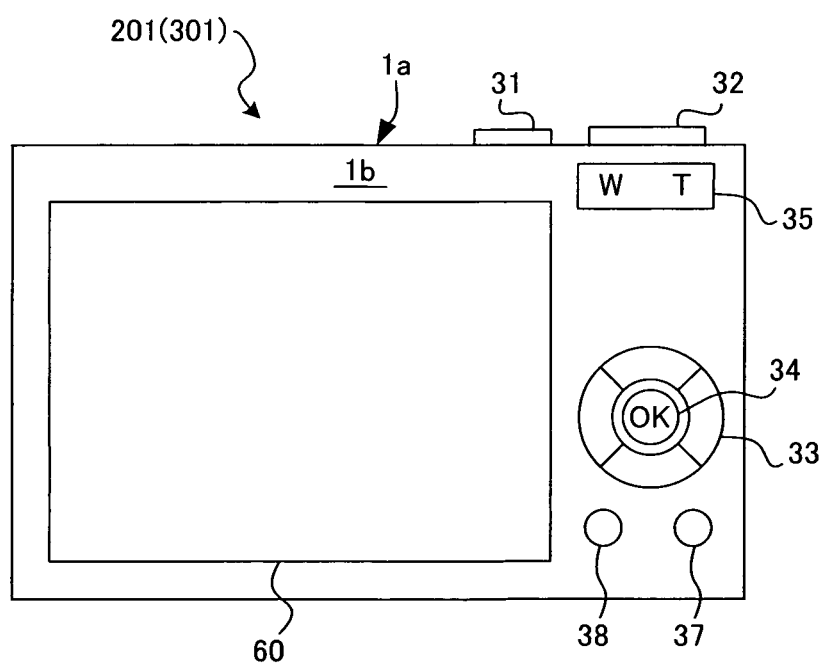

Next, a third embodiment of the camera including an illumination device for photographing that employs the present invention is described. In the third embodiment, portions that fulfill functions the same as in the first embodiment described above are assigned the same reference numerals or reference numerals with the same suffixes, and duplicative descriptions and illustrations are omitted as appropriate. FIG. 11 is an exterior view of a camera 201 of the third embodiment, in which FIG. 11A is a plane view when the camera is viewed from the front and FIG. 11B is a plane view when the camera is viewed from the rear. A block diagram of the camera 201 of the third embodiment is substantially the same as the camera 1 of the first embodiment, and is described with the parenthesized numerals in FIG. 2 assigned thereto.

The third embodiment is not provided with the light emission start button 36 illustrated in FIG. 1. As illustrated in FIG. 11, an LED 2 that emits the AF assist light is provided in the front face portion 1a of the casing separately from the LED light emission unit 70, and a remote control sensing window 3 or the like is also provided in the front face portion 1a. A playback mode button 37 and a photographing mode button 38 are provided at the rear face of the camera 201. The playback mode button 37 is operated when switching from the photographing mode to the playback mode, and the photographing mode button 38 is operated when switching from the playback mode to the photographing mode.

In the third embodiment, a below-described light emission operation of the LED (a light emission operation that emits light while progressively changing the light emission luminance as time elapses from the start of the light emission) is started in response to a half-press operation of the release button 32.

The camera 201 of the third embodiment is configured to be able to perform photographing in a light emission amount increasing mode in which, while continuous light is illuminated at the object by the LED light emission unit 70, the light emission amount from the LED light emission unit 70 progressively increases as time elapses, or a light emission amount decreasing mode in which the light emission amount progressively decreases as time elapses. Hereinafter in the present specification, photographing modes in which the light emission amount of the LED light emission unit 70 is progressively changed in this manner are referred to and described as illumination light variation modes.

The term "continuous light" used herein is intended to include light that continues emission continuously for some duration, but not to include light that is instantaneously emitted, such as flash light.

The camera 201 of the third embodiment is configured to enable selection of an ordinary photographing mode that emits flashlight and performs photographing, beside the above-mentioned illumination light variation modes. The light emission may be provided by the LEDs, or a xenon tube may be provided separately from the LEDs and the light emission provided by the xenon tube.

The LED light emission unit 70 is provided with a light emission amount control circuit that includes plural LEDs, plural transistors provided in correspondence with the plural LEDs, and the like (neither the LEDs nor the light emission control circuit are illustrated). A light emission control unit 292 provided at an ASIC 290 controls current amounts flowing through the LEDs by turning the plural transistors on and off, and thus controls the light emission amount of the continuous light emitted from the LED light emission unit 70 and the speed of change of the light emission amount. The number of LEDs provided at the LED light emission unit 70 is not to be particularly limited and may be, for example, one, or two or more. A method for changing the light emission amount of the LED light emission unit 70 is not to be limited to that described above and may be, for example, a method of providing plural LEDs and increasing/reducing the number of LEDs that are emitting light.

FIG. 12 is a graph illustrating light emission patterns from the LED light emission unit 70 provided at the camera 201. The horizontal axis represents time and the vertical axis represents the light emission amount of the LED light emission unit 70.

Figure 12A:
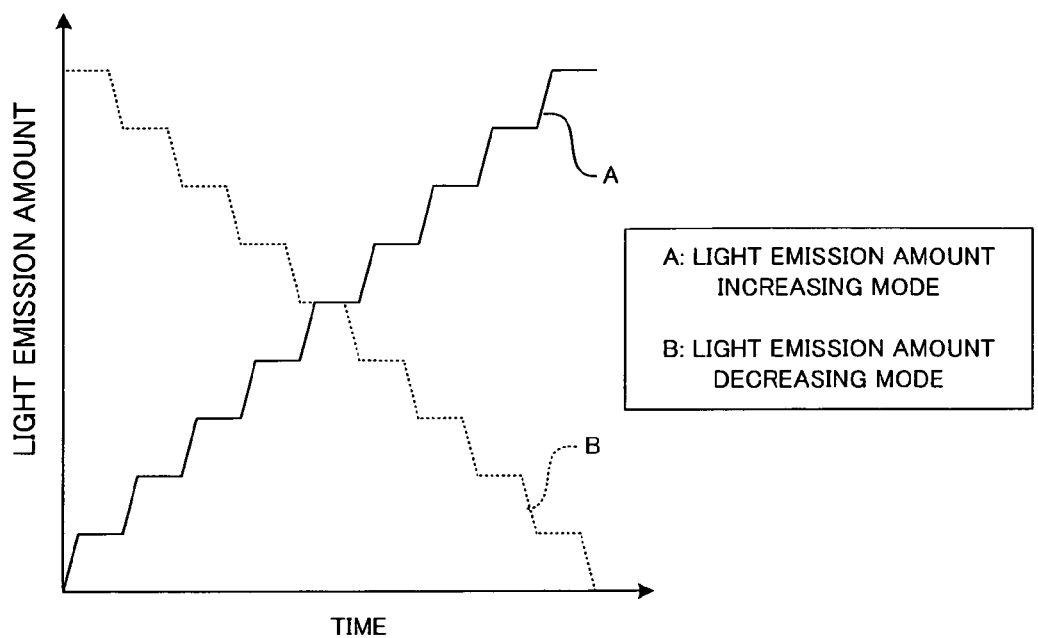
FIG. 12 is a graph illustrating light emission patterns from an LED light emission unit provided at the camera illustrated in FIG. 11.

Graph A in FIG. 12A illustrates changes of the light emission amount in the light emission amount increasing mode, and graph B illustrates the same in the light emission amount decreasing mode.

The configuration of the LED light emission unit 70 of the present embodiment is such that the light emission amounts change stepwise at intervals of a predetermined duration as illustrated in FIG. 12. However, the light emission amount control circuit and a light emission control program may be tuned such that the light emission amount appears to change smoothly.

The light emission control unit 292 can specify the light emission amount change range and light emission amount change speed of the LED light emission unit 70 to arbitrary values.

Figure 12B:
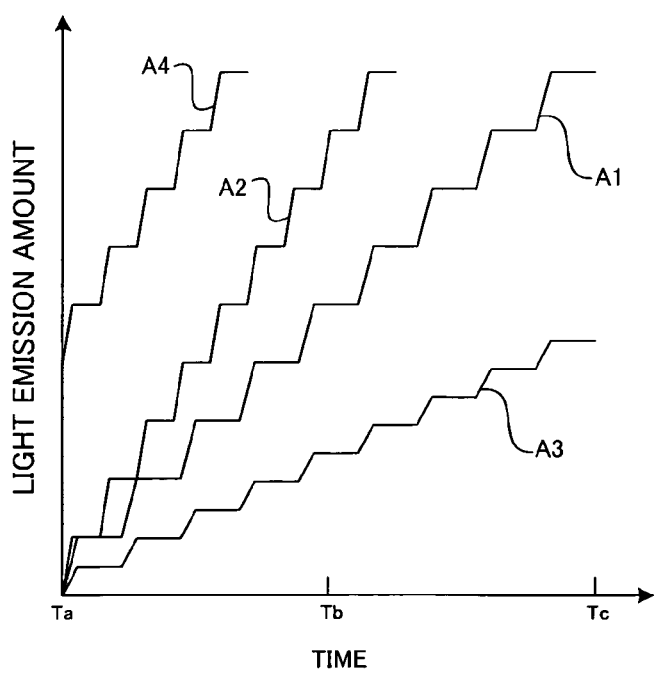

The graph of FIG. 12B illustrates plural examples of light emission patterns with different ranges of change and speeds of change of the light emission amount. The light emission patterns of graph A1 and graph A2 have full light emission amounts (maximum light emission amounts) that are the same, but graph A2 reaches the full light emission amount in a quicker time. The light emission pattern of graph A3 has a smaller light emission amount when at full light emission than the light emission pattern of graph A1 but the time duration to reach the full light amount is the same as with the light emission pattern of graph A1. The light emission pattern of graph A4 has a light emission amount when starting light emission that is not zero but starts light emission with a light emission amount of around half of the full light emission amount.

When photographing in the illumination light variable mode, the camera 201 progressively changes the light emission amount of the LED light emission unit 70, which is to say the light amount of the continuous light being illuminated at the object, as time elapses. During this time, reflected light from the object (object light) is exposed onto the imaging device 11, and a through-image based on this object light is displayed on the LCD monitor 60.

In the light emission amount increasing mode, the reflected light from the object (object light) starts dark and progressively gets brighter. Therefore, the photographer can verify the appearance of the object getting progressively brighter in real time from the through-image.

Similarly, in the light emission amount decreasing mode, the photographer can verify the appearance of the object getting progressively darker in real time.

Thus, the photographer can check the object image from the through-image, perform the shutter operation (the full-press operation of the release button 32) at the timing at which the photographer thinks the light emission amount is most suitable, and cause the camera 201 to start the photographing operation.

Next, control that is performed by the ASIC 290 when the camera 201 of the third embodiment is used to perform photographing in the light emission amount increasing mode of the illumination light variable mode is described.

Figure 13:
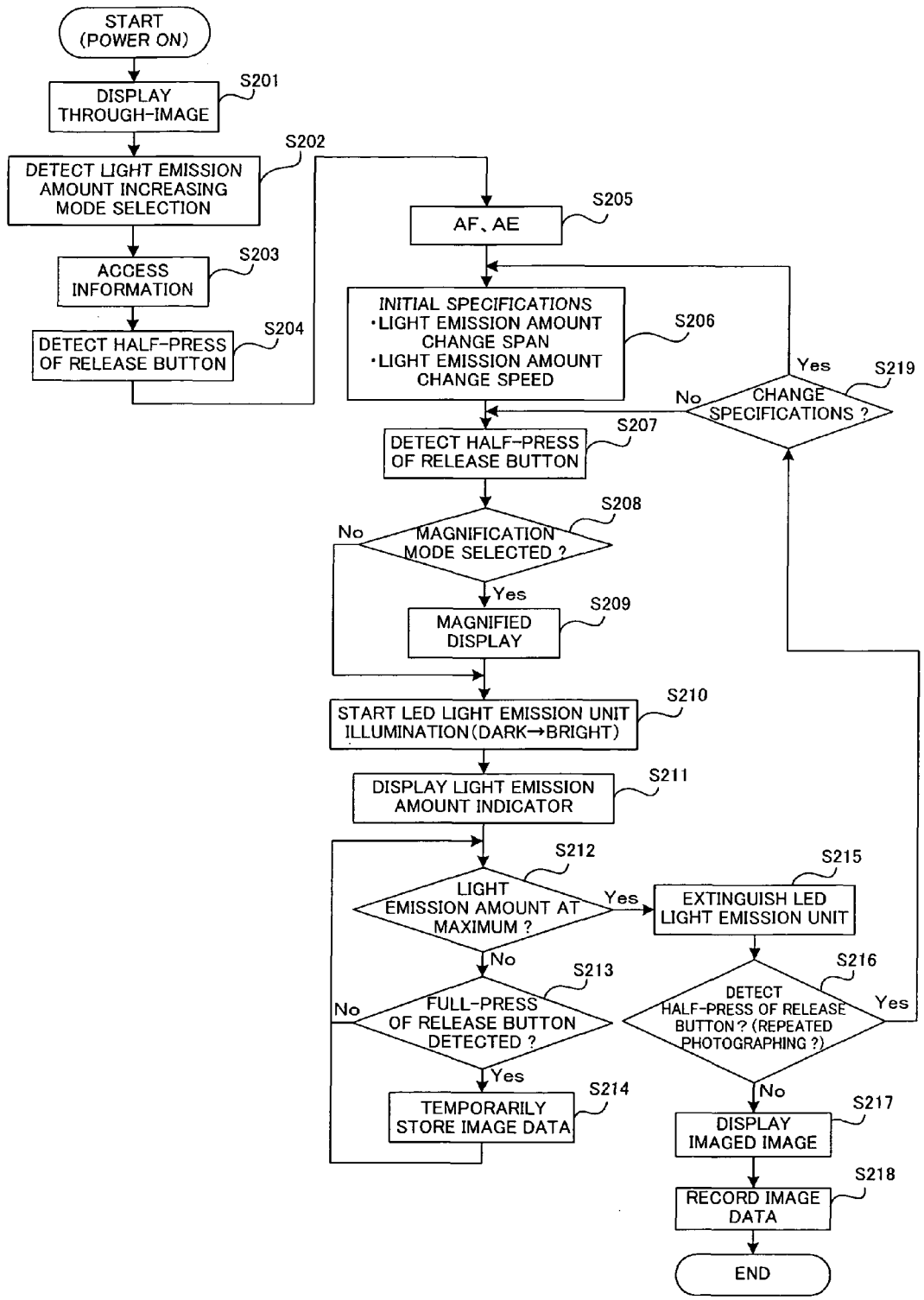
FIG. 13 is a flowchart illustrating control that is performed at the time of photographing by an ASIC provided at the camera illustrated in FIG. 11.

FIG. 13 is a flowchart illustrating control that is performed at the time of photographing by the ASIC 290 provided in the camera 201 illustrated in FIG. 11, which is below described step-by-step.

(Step 201: Display Through-Image)

When the ASIC 290 senses the turning-on operation of the power switch 31, the ASIC 290 performs control to open the shutter 22 provided at the lens barrel 20 and drives the imaging unit 10. The ASIC 290 causes the through-image to be displayed on the LCD monitor 60 on the basis of outputs from the imaging unit 10, and proceeds to step S202. The photographer carries out framing while checking the through-image.

(Step S202: Detect Illumination Light Variable Mode Selection)

The ASIC 290 causes a selection screen for selecting one of the light emission amount increasing mode and the light emission decreasing mode to be displayed on the LCD monitor 60. If the light emission amount increasing mode is selected by the photographer, the ASIC 290 then proceeds to step S203. The method of mode selection is not to be limited to this. For example, a dedicated push-button may be provided.

In combination with the mode selection, the photographer sets whether the light emission amount change range and change speed are to be specified manually (manual specification mode) or are to be specified automatically by the ASIC 290 in accordance with photometry results in step S206 described below (automatic specification mode).

(Step S203: Access Light Emission Amount Control Information)

The ASIC 290 accesses light emission amount control information stored in the memory 50, and proceeds to step S204. The light emission amount control information includes data that the light emission control unit 292 refers to when setting various parameters relating to light emission amounts in step S206, described below.

(Step S204: Detect Half-Press of Release Button)

When the ASIC 290 detects a half-press operation of the release button 32 by the photographer, the ASIC 290 proceeds to step S205 and carries out AF control and AE control. A configuration is possible in which continuous AE and AF are performed before the half-press operation.

(Step S205: AF, AE)

The ASIC 290 implements publicly known contrast detection-type AF control, moving a portion of the photographing lens 21 (the focusing lens) in the optical axis direction and detecting the lens position at which the contrast of the object image in the pre-specified AF area F is highest.

The ASIC 290 also implements AE control, acquiring, for example, object luminance information at the photometry points provided in the vicinity of the AF area F on the basis of outputs of the imaging unit 10, and setting the shutter speed, photographing sensitivity and the like on the basis of this luminance information (and proceeds to step S206).

(Step S206: Initial Specifications)

If the automatic specification mode is selected in step S202, the ASIC 90 sets the light emission amount change range (the minimum light emission amount and the maximum light emission amount) and the light emission amount change speed (the duration to reach from the minimum light emission amount to the maximum light emission amount) of the LED light emission unit 70 on the basis of photometry results obtained in step S205 (and proceeds to step S207). If the manual specification mode is selected, the ASIC 290 sets the light emission amount change range and the light emission amount change speed in accordance with inputs by the photographer.

A number of light emission patterns are prepared beforehand for the LED light emission unit 70. If the automatic specification mode is selected, the light emission control unit 292 selects a suitable light emission pattern from the prepared light emission patterns on the basis of the photometry results. Information relating to these light emission patterns is included in the light emission amount control information stored in the memory 50.

Describing examples: For example, if the result of photometry is that reflected light from the object is brighter than a predetermined reference value, the light emission control unit 292 determines that there is no need to perform light emission up to the maximum value that the LED light emission unit 70 is capable of, and performs light emission control with a light emission pattern as illustrated in graph A3 in (b) of FIG. 12. For example, if the reflected light from the object is darker than a predetermined reference value, light emission control is performed with a light emission pattern as illustrated in graph A4 in (b) of FIG. 12. Even if the automatic specification mode is selected, the photographer may amend the light emission pattern specified by the light emission control unit 292 by manual inputs.

(Step S207: Detect Half-Press of Release Button)

When the ASIC 290 detects that a further half-press operation of the release button 32 has been detected, the ASIC 290 proceeds to step S208.

(Step S208: Confirm Magnification Mode Selection)

The ASIC 290 displays a selection screen on the LCD monitor 60 and enquires to the user as to whether or not to display a portion of the through-image magnified.

If the photographer selects a magnification mode, the ASIC 290 proceeds to step S209, described below, and accordingly magnifies the display of part of the through-image. If the photographer does not select the magnification mode, control passes to step S210, described below.

(Step S209: Magnify Display Screen)

Figure 14A:
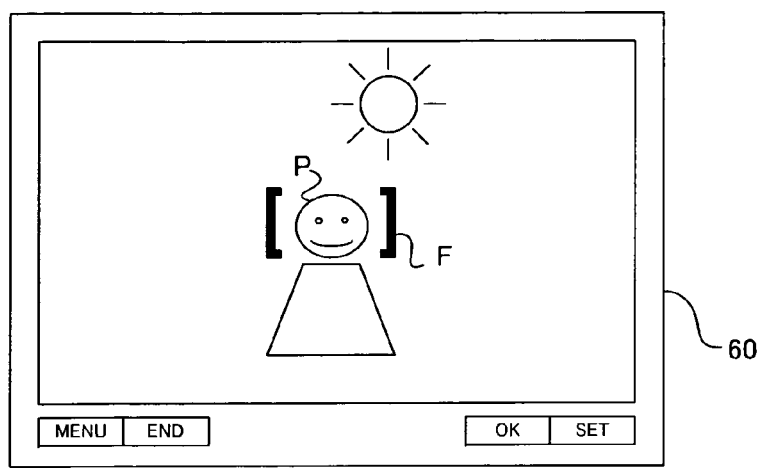
FIG. 14 is a diagram illustrating examples of a through-image that is displayed at an LCD monitor provided at the camera illustrated in FIG. 11.
Figure 14B:
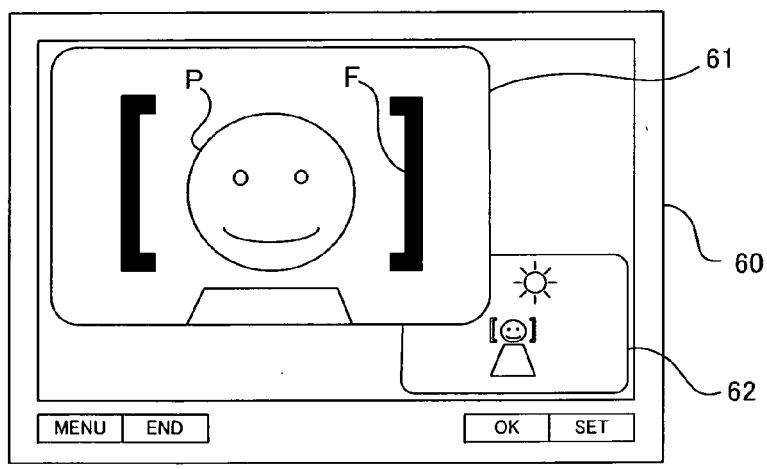
Figure 14C:
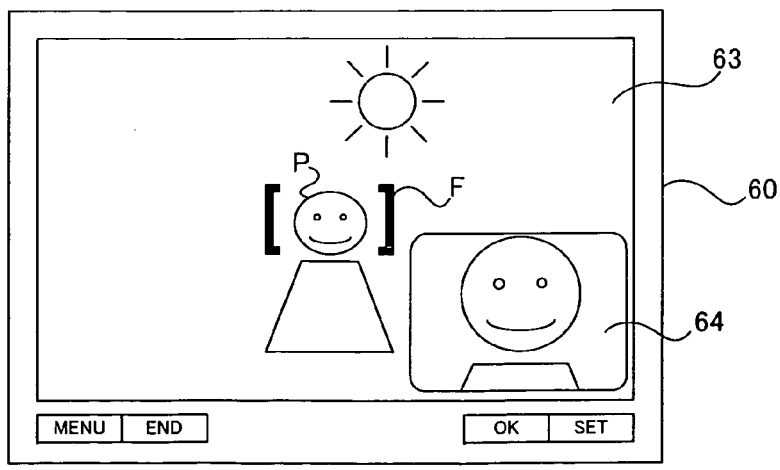

FIG. 14 is a diagram illustrating examples of a through-image that is displayed at the LCD monitor 260 provided at the camera 201 illustrated in FIG. 11. FIG. 14A illustrates a display screen in the usual display mode (with a magnification ratio of 1), and FIG. 14B illustrates a display screen in the magnified display mode.

Similarly to the first embodiment, when the magnified display mode is selected, the ASIC 290 of the present embodiment performs processing to'magnify the display of the image of a desired region within the photographed image, for example, a predetermined range containing the AF area F.

As illustrated in FIG. 14A, in the usual display mode, the AF area F is specified to be a region of the face of the person P, which is substantially in the middle of the screen and is the principal object.

In the magnified display mode as illustrated in FIG. 14B, the display is magnified to pinpoint the portion including the AF area F (the region of the face of the person P). As illustrated in FIG. 14B, the magnified display screen 61 is displayed using about three-quarters of the image display region of the LCD monitor 60, and the whole object image (the whole through-image) is displayed reduced in another region 62 (and control passes to step S210).

The size of the region 62 is smaller than the size of the magnified display screen 61.

By selecting this magnified display mode, the photographer can check the brightness of the object (states of change of the brightness) in detail at the portion of the object that is defined by the AF area F (the portion that is being focused on).

The method of implementing magnified display is not limited to the display mode illustrated in FIG. 14B, and may be a display mode as in FIG. 14 C in which the display window 64 for magnified display is displayed superimposed within (on top of) the image 63 that is displayed in the usual display mode.

(Step S210: Start Illumination)

The light emission control unit 292 of the ASIC 290 controls the LED light emission unit 70 and starts illumination of illumination light at the object, and the ASIC 290 proceeds to step S211.

From step S210 until the LEDs are extinguished in step S215, described below, the light emission control unit 292 continues to cause continuous light to be illuminated from the LEDs while progressively changing the light emission amount as time elapses (i.e., while progressively increasing the light emission luminance by increasing the currents applied to the LEDs). During imaging (recording) in step S214, described below, the luminance of the LEDs is not changed in that moment.

The present step S210 is executed when a half-press of the release button is detected in step S207. In other words, step S210 is executed in response to a half-press operation of the release button 32 by the user.

(Step S211: Display Light Emission Amount Indicator)

The ASIC 290, while performing light emission amount increasing control so as to progressively brighten the light emission amount of the continuous light being illuminated by the LED light emission unit 70 as time elapses, displays an indicator representing the state of change of the light emission amount on the LCD monitor 60 (and proceeds to step S212).

Figure 15A:
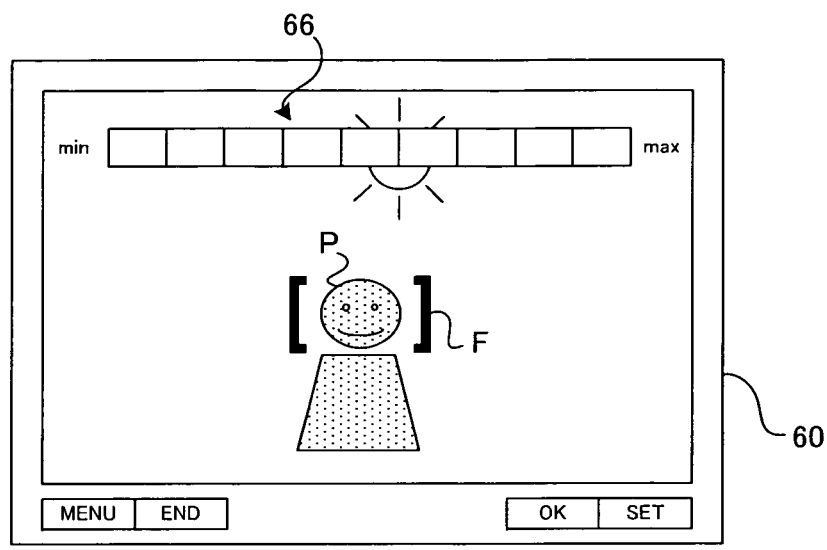
FIG. 15 is a diagram illustrating examples of a display screen in a state of displaying an indicator together with the through-image illustrated in FIG. 14.

FIG. 15 is a diagram illustrating examples of a display screen in a state of displaying the indicator representing the state of change of the light emission amount together with the through-image illustrated in FIG. 14 (a backlit scene, which is a mode of flashlight photographing). FIG. 15A illustrates the state just after the start of light emission and FIG. 5B illustrates the state just before the light emission amount is at the maximum.

Figure 15B:
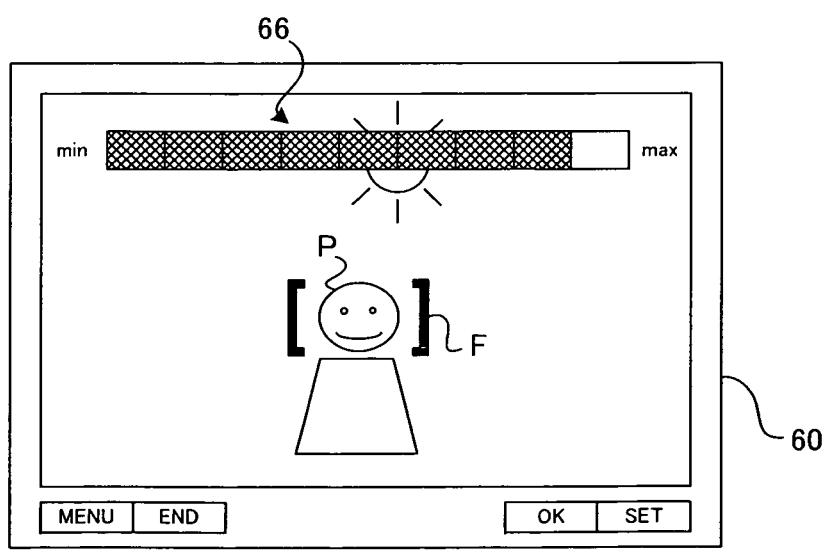

As illustrated in FIGS. 15A and 15B, the indicator 66 displayed on the display screen of the LCD monitor 60 has the form of a bar graph (strip graph). For example, portions of the indicator 66 change color as the light emission amount changes.

By checking the indicator 66, the photographer can understand, for example, how far the current light emission amount is from the maximum light emission amount, that is, how much more the object can be lit up.

(Step S212: Determine Maximum Light Emission Amount)

The ASIC 90, while carrying out the light emission amount increasing control starting from step S210 and the indicator display control starting from step S3, determines whether or not the light emission amount of the LED light emission unit 70 has reached the maximum light emission amount specified in step S206. While the light emission amount has not reached the maximum light emission amount, control passes to step S213, and when the light emission amount reaches the maximum light emission amount, control passes to step S215.

(Step S213: Detect Full-Press of Release Button)

When the ASIC 90 detects the full-press operation of the release button 32, the luminance change control of the illumination light from the LEDs that has been carried out since step S210 is temporarily paused (the LED luminance is maintained from the moment of the full-press), and the ASIC 90 proceeds to step S214. While the full-press operation of the release button 32 is not detected, control returns to step S212 and the subsequent processing is repeated.

(Step S214: Temporarily Store Image Data)

An photographing control unit 291 of the ASIC 290 starts the photographing operation in response to the full-press operation of the release button 32. Specifically, the imaging unit 10 starts to accumulate object light from that moment.

When the shutter 22 closes and the accumulation finishes, the imaging unit 10 converts the light to electronic signals by optoelectronic conversion and outputs the same to the ASIC 290. An unillustrated image processing unit of the ASIC 290 generates image data on the basis of these electronic signals.

The ASIC 290 writes to the memory 50 and stores this image data, and then the ASIC 290 starts the luminance change control of the illumination light from the LEDs, returns to step S212, and repeats the subsequent processing. Therefore, repeated photographing can be performed in response to full-press operations of the release button 32 until the light emission amount of the LED light emission unit 70 is at the maximum. Even when this repeated photographing is performed, the light emission amount of the illumination light continues to increase with each image (with the light emission amount being constant within the individual images). Therefore, the plural images that are imaged will be images with respectively different amounts of illumination light on the object. Thus, by repeating the processing from step S212 to step S214, the camera 201 can perform "bracketing photographing".

(Step S215: Extinguish LED Light Emission Unit)

When it is determined in step S212 that the maximum light emission amount has been reached, the light emission control unit 292 ends (extinguishes) the illumination of illumination light by the LED light emission unit 70, and proceeds to step S216.

(Step S216: Determine Photographing Repetition)

The photographer can continue repeated photographing in the light emission amount change mode by half-press operations of the release button 32. If, after the LED light emission unit 70 is extinguished, the ASIC 290 detects a half-press operation of the release button 32 before a predetermined duration has elapsed, the ASIC 290 then performs control to open the shutter 22 and proceeds to step S219 (described below), and performs successive photographing control.

On the other hand, if a half-press operation of the release button 32 is not detected before this predetermined duration has elapsed, the ASIC 290 then proceeds to step S217.

(Step S217: Display Photographed Image)

The ASIC 90 displays the image data stored in the memory 50 in step S214 on the LCD monitor 60 as an photographed image. If there are plural sets of image data that have been imaged with different illumination light emission amounts, the ASIC 90 displays photographed images based on these sets of image data as thumbnails and proceeds to step S218. If a full-press operation of the release button 32 is not detected while the illumination light is illuminating (i.e., if there is no image data), the ASIC 290 skips step S217 and the following step S218, and ends the processing.

(Step S218: Record Image Data)

The ASIC 290 records image data selected by a user such as the photographer or the like from the photographed images displayed on the LCD monitor 60 in step S217 to the card 40, and ends the processing.

(Step S219: Confirm Specification Changes)

The ASIC 290 displays a confirmation screen for whether or not to change specifications on the LCD monitor 60, and enquires to the photographer as to whether or not to make changes from the initial specifications of the light emission amount increasing mode. If the photographer makes a selection to the effect of not changing the specifications, (photographing again with the same parameters), control returns to step S207, and the ASIC 290 performs the light emission amount change control again with the parameters specified in step S206.

On the other hand, if the photographer makes a selection to the effect of changing the specifications, the ASIC 290 then returns to step S206 and displays the specification screen on the LCD monitor 60. The photographer re-specifies the light emission amount change span and change speed manually in the specification screen, and carries out photographing again. At this time, rather than the manual specification, photometry may be performed again and the light emission amount change span and change speed set automatically.

Hereabove, control at the time of photographing in the illumination light increasing mode is described using the flowchart illustrated in FIG. 13, but the ASIC 290 performs control that is largely the same in the illumination light decreasing mode too. Below, just the differences are described.

In step S210 of FIG. 13, the light emission control unit 92 of the ASIC 290 controls the LED light emission unit 70 to illuminate continuous light at the object. In this case however, the light emission amount of the LED light emission unit 70 starts at the maximum light emission amount and the light emission amount decreases as time elapses. In step S3, the progress of the indicator 66 is opposite to that in the light emission amount increasing mode.

In step S212, the ASIC 290 determines whether or not the light emission amount is at the minimum light emission amount of the specified range, and proceeds to step S215 if the minimum light emission amount is at the minimum. However, if the minimum light emission amount is set to zero, the ASIC 290 skips step S215 and proceeds to step S216.

According to the third embodiment of the camera described above, the following effects may be provided.

(1) Because the photographer can check the appearance in which the illumination light emission amount is changing via the through-image, the photographer can reliably determine whether a light amount of the illumination light on the object is suitable (that there is no shadow portion, that there is no color saturation, and the like), and usability when photographing is good.

(2) Because the state of change of the light emission amount is displayed by the indicator 66, the photographer can predict how much the light emission amount will change subsequently, and can easily ascertain a timing for starting the photographing operation.

(3) Because the light emission amount simply increases or decreases substantially in proportion to elapsed time, changes in the light emission amount are easy to foresee and the photographing timing is easy to ascertain.

(4) Plural images with different exposures (bracketing images) can be imaged while the illumination light emission amount is changing. If a light emission amount is set on the basis of AE results, the principal object may be underexposed or overexposed, for example, when reflection levels of light in the background of the principal object are very high or very low, or the like. In contrast, because the camera 1 of the present embodiment can easily perform bracketing photographing, the possibility of being able to take photographs with suitable exposure is higher.

(5) The light emission amount change span and change speed can be both arbitrarily specified by manual operations and automatically specified by the ASIC 290 on the basis of photometry results, which is convenient.

(6) The light emission amount change speed can be specified to an arbitrary value. Therefore, for example, if the light emission amount change speed is slowed, it is easy for a photographer to perform photographing with a desired light emission amount without losing a shooting opportunity.

(7) The light emission amount change span can be arbitrarily specified. Therefore, there is no need to always change from a light emission amount of zero to the maximum value that the LED light emission unit 70 is capable of, and the photographing time can be shortened.

(8) Because the region corresponding to the AF area F is displayed magnified in the through-image during framing, the illumination condition of the object at the position that is being focused on can be checked in detail.

Fourth Embodiment

Next, a fourth embodiment of the camera including an illumination device for photographing that employs the present invention is described. In the fourth embodiment, portions that fulfill functions the same as in the third embodiment described above are assigned the same reference numerals or reference numerals with the same suffixes, and duplicative descriptions and illustrations are omitted as appropriate.

A camera 301 of the fourth embodiment is provided with substantially the same structure as the camera 201 of the third embodiment, and is described with the parenthesized numerals in FIG. 2 and FIG. 11 assigned thereto.

Similarly to the camera 201 of the third embodiment, the camera 301 of the fourth embodiment performs control to change the light emission amount from the LED light emission unit 70 at the time of photographing, and progressively increases or decreases the light emission amount within a predetermined range as time elapses. While the camera 201 of the third embodiment performs control to end the light emission control when the light emission amount reaches the upper limit or lower limit, the camera 301 of the fourth embodiment performs (a first loop of) the light emission control and, when the light emission amount reaches the upper limit or lower limit, automatically performs a second loop of the light emission control.

That is, the camera 301 of the fourth embodiment accepts an photographing reservation by the photographer during the first loop of light emission control, and starts the photographing operation during the second loop of light emission control when the light emission amount of the LED light emission unit 70 is substantially the same as the light emission amount at the time of receiving the reservation.

Herebelow, control that is carried out by an ASIC 390 provided at the camera 301 of the fourth embodiment at the time of photographing is described.

Figure 16:
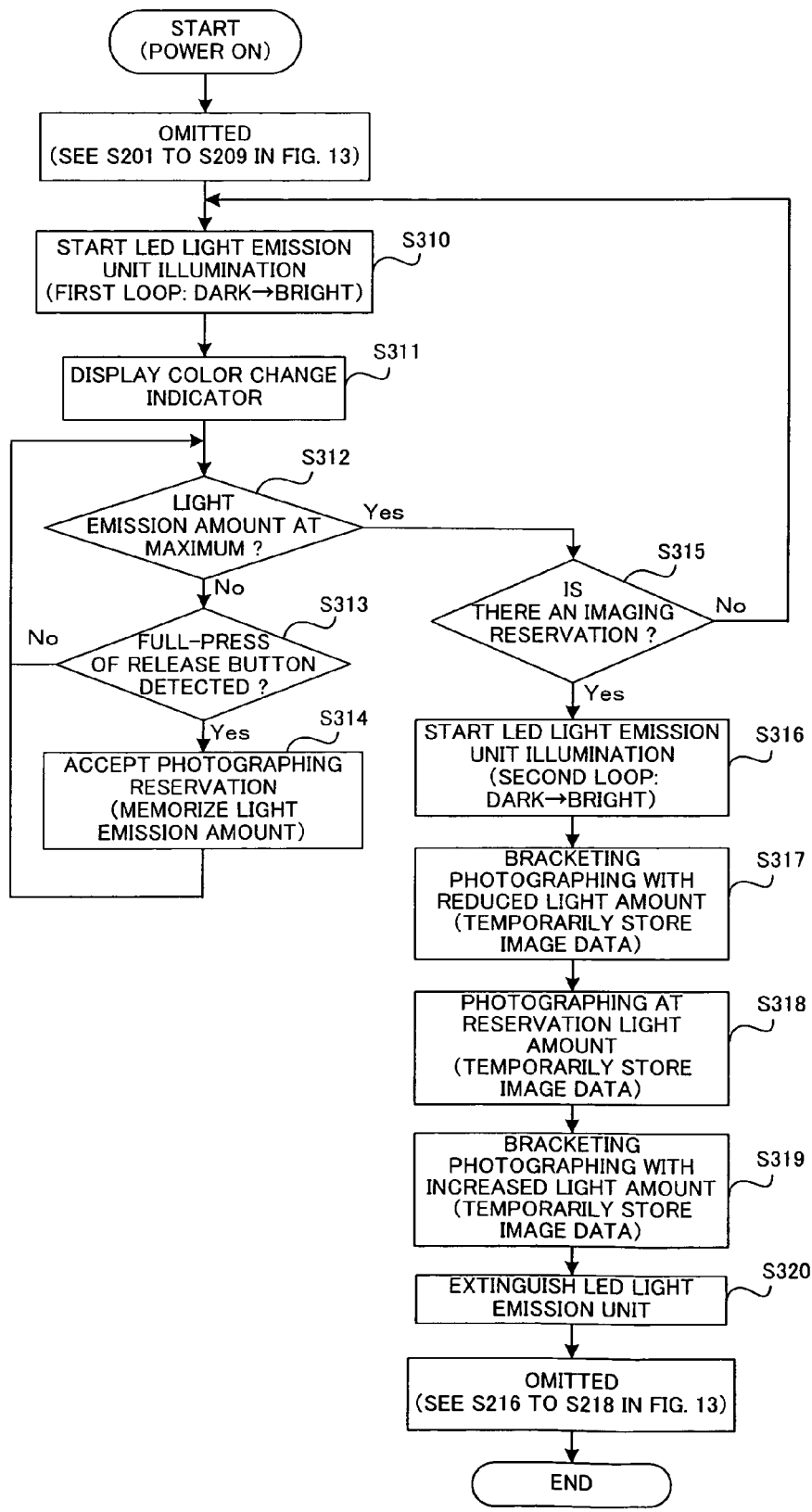
FIG. 16 is a flowchart illustrating control that is performed at the time of photographing by an ASIC provided at a camera of a third embodiment.

FIG. 16 is a flowchart illustrating the control that is performed at the time of photographing by the ASIC 390 provided at the camera of the fourth embodiment.

The control that is performed by the ASIC 290 of the third embodiment from step S201 to step S209 is performed in the same manner by the ASIC 390 of the fourth embodiment, so is not described here. Subsequent processing is described.

A light emission control unit 392 of the ASIC 390 controls the LED light emission unit 70 in response to a half-press operation of the release button 32 and causes the illumination light to be illuminated at the object (step S310). The ASIC 390 carries out the light emission amount increasing control of the LED light emission unit 70, while displaying an indicator representing the state of change of the light emission amount (see FIG. 15) on the LCD monitor 60 (step S311).

When the ASIC 390 detects the full-press operation of the release button 32 ("yes" in step S313) while the light emission amount from the LED light emission unit 70 is changing ("no" in step S312), the ASIC 390 accordingly accepts the photographing reservation. When the ASIC 390 accepts the photographing reservation, the ASIC 390 records, in the memory 50, the light emission amount of the LED light emission unit 70 at the moment at which the full-press operation of the release button 32 is performed (step S314).

By monitoring the object being illuminated by the LED light emission unit 70 (the through-image) with the LCD monitor 60 and performing a full-press operation of the release button 32 at the moment when the illumination light amount is appropriate, the photographer can send an photographing reservation signal to the ASIC 390.

This photographing reservation may be performed repeatedly up until the light emission amount of the LED light emission unit 70 reaches the maximum.

Figure 17:
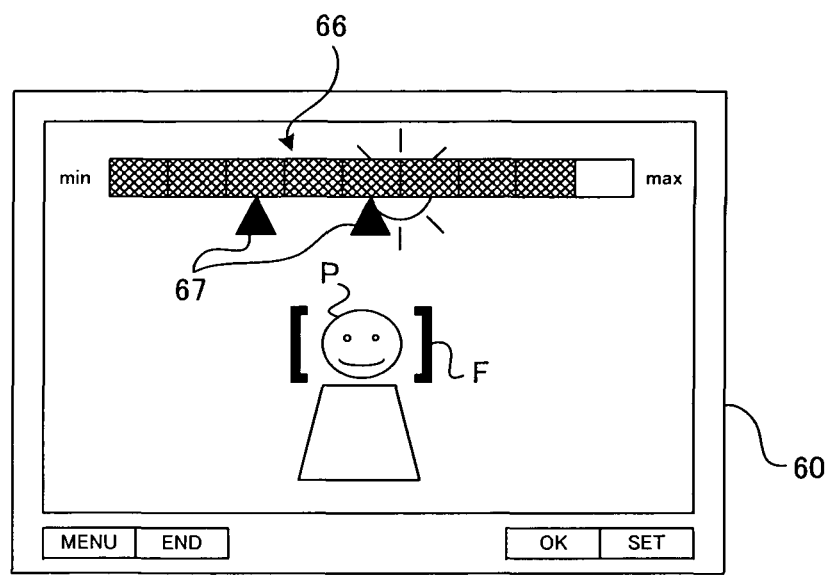
FIG. 17 is a diagram illustrating an example of a display screen of an indicator displayed together with a through-image that is displayed at an LCD monitor of the fourth embodiment.

FIG. 17 is a diagram illustrating the display screen when an photographing reservation has been accepted.

In FIG. 17, the reservation mark 67 indicates what the light emission amount is at the moment at which the photographing reservation is accepted. In the case of FIG. 17, the reservation marks 67 indicate that photographing reservations have been accepted at two points.

When the light emission amount of the LED light emission unit 70 reaches the maximum, the ASIC 390 determines whether or not there is an photographing reservation (step S315). If there is no photographing reservation, the ASIC 390 returns to step S310, starts the light emission of the LED light emission unit 70 (the first loop) again, and waits for the input of an photographing reservation signal.

If there is an photographing reservation, the ASIC 390 starts the second loop of light emission from the LED light emission unit 70 (step S316).

The ASIC 390 carries out the second loop of light emission control, and automatically performs bracketing photographing.

The ASIC 390 starts an photographing operation at a moment at which the light emission amount is smaller by a predetermined amount than the light emission amount at the time of acceptance of the reservation, which is recorded in the memory 50, and stores the image data generated by this photographing operation in the memory 50 (step S317). The image formed by this image data is an image that is underexposed compared to the image intended by the photographer. How much the light emission amount is offset when bracketing photographing is performed may be arbitrarily specified.

The ASIC 390 also starts respective photographing operations at the moment at which the light emission amount of the LED light emission unit 70 is substantially the same as the light emission amount at the time of accepting the reservation (step 318) and the moment at which the light emission amount is greater by the predetermined amount than the light emission amount at the time of accepting the reservation (step S319), and saves the image data generated by these photographing operations to the memory. The image imaged in step S319 is an image that is overexposed compared to the image intended by the photographer. If plural photographing reservations are specified, the ASIC 390 performs bracketing photographing for each of the photographing reservations.

Thereafter, the ASIC 390 ends light emission from the LED light emission unit 70 (step S320) and displays the imaged bracketing images on the LCD monitor 60 (see step S217 in FIG. 13).

The photographer inspects the image imaged at the desired light emission amount and the images in which exposure is a little over and a little under relative to that image, selects a desired image, and causes the same to be recorded to the card 40.

Because the camera 301 of the fourth embodiment described above accepts the photographing reservation in the first loop and performs photographing in the second loop, in the first loop the photographer can apply themselves to checking that the illumination light can be reliably illuminated at the object (that there are no areas in shadow and the like) and the like, and can set the precise composition in the second loop.

Thus, with the camera 301 of the fourth embodiment, the photographer can perform the work of setting the light emission amount and the work of setting the composition separately, and user-friendliness is improved.

Variant Embodiments

Numerous modifications and alterations as described below of the embodiments described above are possible. These are to be included in the technical scope of the present invention.

(1) The illumination device of each embodiment is incorporated in the camera. However, the illumination device is not to be limited thus and may be provided to be attachable to and detachable from an imaging device such as a camera or the like.

(2) The camera of each embodiment is a digital camera that displays a through-image on an LCD monitor. However, the camera is not to be limited thus, and may be a film camera that records images on silver salt film. In this case, the photographer may perform photographing while checking the appearance in which the color of the illumination light is changing by viewing through an optical viewfinder or viewing the object with the naked eye.

(3) The camera of the first or second embodiment changes the color between two colors with a complementary relationship, but this is not to be limiting. The color temperature of the illumination light may be changed.
In this case, control is performed to start light emission at a color temperature of around 2,000 K, which is a dark orange, and progressively raise the color temperature. Describing this more specifically, as time elapses, the illumination light changes from dark orange to yellow (about 4,000 K), from yellow to white (about 6,000 K), and from white to a blue-tinged white (about 10,000 K) (or possibly in the reverse order).

Further, as a continuous change pattern of the light emission, a warm color change pattern that changes continuously between warm colors (red, orange, yellow, etc.) may be provided (looking at FIG. 6, a light emission pattern that continuously varies between red R and yellow Y), or a cold color change pattern that changes continuously between cold colors (blue-green, blue, blue-purple, etc.) may be provided (looking at FIG. 6, a light emission pattern that continuously varies between blue B and cyan C). Further yet, a neutral color change pattern that changes continuously between neutral colors (yellow-green, green, dark green, etc.) may be provided (looking at FIG. 6, a light emission pattern that continuously varies in the vicinity of green G), or a neutral color change pattern that changes continuously between purplish neutral colors (purple and colors near purple) may be provided (looking at FIG. 6, a light emission pattern that continuously varies in the vicinity of magenta M).

(4) The camera of the second embodiment performs light emission color bracketing photographing in the second loop. However, a single image, at the light emission color the same as the light emission color at the time of input of the reservation, may be imaged without performing bracketing photographing.

(5) The camera of the second embodiment performs both light emission color bracketing in the second loop and light emission amount bracketing in the third loop. However, this is not to be limiting. For example, the light emission amount bracketing may be performed in the second loop and the light emission color bracketing in the third loop.

(6) In each embodiment, the indicator displayed at the LCD monitor (display unit) has the form of a bar graph (strip graph). However, this is not to be limiting. The state of change of the light emission amount may be represented by numerals (for example, a percentage display).

(7) In the third and fourth embodiments, patterns in which the light emission amount simply increases or decreases are described. However, light emission patterns of the illumination light are not to be limited thus. For example, control may be performed such that the illumination light emission amount progressively increases as time elapses and, after reaching the maximum light emission amount, continues in the opposite direction, progressively decreasing the light amount.

(8) In the fourth embodiment, the light emission pattern may be made different between the first loop and the second loop. For example, if the light emission amount at the time at which the image reservation is made is close to the maximum light emission amount, the second loop may be set to the light emission amount decreasing mode. Further, the second loop may start illumination of the illumination light from a light emission amount required for bracketing photographing and extinguish the illumination light at the moment that bracketing photographing has ended.

(9) A camera may be configured to perform photographing with both the photographing pattern of the third embodiment (photographing in response to a full-press of the release button during light emission) and the photographing pattern of the fourth embodiment (photographing reservation in response to a full-press of the release button during light emission), and to be capable of switching between these functions.

(10) The photographing operation may be performed automatically in accordance with changes in the light emission amount rather than waiting for an photographing instruction signal that is sent by the photographer. For example, the LED light emission unit of the third or fourth embodiment may change the light emission amount in steps. Thus, bracketing with offset light emission amounts may be performed by starting the photographing operation automatically each time the light emission amount increases (or decreases) by one step. After these photographing operations, the photographer may select a desired image from the plural images with different exposures.

(11) The third and fourth embodiments may be configured such that, similarly to the first and second embodiments, an externally operable LED operation button separate from the release button is provided at the camera (for example, on the rear face or upper face of the camera), and when this LED operation button is operated, the LED operation unit emits light while changing the light emission luminance.

(12) In the third and fourth embodiments, similarly to the first and second embodiments, the LED light emission unit may, rather than only functioning as an photographing assist light, function as the AF assist light and an LED for self-timer photographing. For example, if also used as the AF assist light, the light emission luminance may be lowered and the light emission luminance may be set to not vary during the illumination. Thus, when a half-press operation of the release button is performed, the AF operation is performed using the AF assist light and, subsequent to focusing, the LED light emission unit automatically goes on to the operations described in the above embodiments (FIG. 13 or FIG. 16) (that is, an operation of illuminating while changing the light emission luminance of the LEDs as time elapses). During this luminance changing light emission operation, control such that the light emission luminance that was used for the AF assist light just before is maintained and used as the initial light emission luminance, and progressively changes from this light emission luminance to a high luminance as time elapses, is preferable in regard to shortening the control duration.

(13) A configuration is possible in which light emission color change patterns are associated with each of specified photographing modes (a light emission pattern being provided as a default for each photographing mode), and the color change light emission pattern that corresponds to an photographing mode selected by a photographer is automatically selected.

In this case, plural light emission patterns are provided as color change light emission patterns. For example, the following may be provided: a warm color change pattern that changes continuously between warm colors (red, orange, yellow, etc.) (looking at FIG. 6, a light emission pattern that continuously varies between red R and yellow Y); a cold color change pattern that changes continuously between cold colors (blue-green, blue, blue-purple, etc.) (looking at FIG. 6, a light emission pattern that continuously varies between blue B and cyan C); and a skin color change pattern that changes continuously between skin colors (colors close to different skin colors balanced between red and yellow, about an orange that is close to skin color) (looking at FIG. 6, a light emission pattern that continuously varies about an orange (not shown) between red R and yellow Y).

For example, if a light emission color variation mode is specified and the user selects a night view photographing mode that controls exposure to be suitable for a sunset image, a sunrise image or the like, the warm color change pattern is automatically selected, and the LED light emission unit 70 continuously emits light in the warm color change pattern.

If the light emission color variation mode is specified and the user selects a portrait photographing mode that controls exposure to be suitable for photographing a person, the skin color change pattern is automatically selected, and the LED light emission unit 70 continuously emits light in the skin color change pattern.

If the light emission color variation mode is specified and the user selects a beach photographing mode or cuisine photographing mode that controls exposure to be suitable for photographing a beach or photographing cuisine, the cold color change pattern is automatically selected, and the LED light emission unit 70 continuously emits light in the cold color change pattern.

There is no limitation that only one of the above light emission patterns is to be assigned to each photographing mode; the light emission patterns may be plurally assigned. For example, if the night view photographing mode for photographing night scenes is selected, the cold color change pattern and the warm color change pattern may both be selected and the two light emission patterns successively switched between in a chronological sequence. Among night view photographing scenes, there are cold color night views and there are warm color night views. Therefore, if the two light emission patterns are automatically selected, it is possible to respond to both kinds of night view.

In the above description, the light emission color change patterns are associated with each of the photographing modes. However, light emission amounts (light emission luminance) change patterns may also be associated with each of the photographing modes. For example, at a beach, photographing of scenes that are strongly backlit by sunshine is expected. Therefore, a high luminance light emission mode in which the range of continuous variation of the light emission luminance is restricted to close to a high luminance (a light emission mode that continuously varies in a light emission luminance range from the middle portion of the color change pattern 65 of FIG. 15 to the maximum at the right end) is associated with the beach photographing mode. When photographing night views, cases in which illumination with a relatively low luminance is sufficient are expected. Therefore, a low luminance light emission mode in which the range of continuous variation of the light emission luminance is restricted to a range that does not include high luminances (a light emission mode that continuously varies in a light emission luminance range from the minimum at the left end of the color change pattern 65 of FIG. 15 to a region a little to the right of the middle portion) is associated with the night view photographing mode.

(14) A configuration is possible in which the above-described luminance change light emission pattern that changes the light emission amount of the illumination light (the light emission luminance) and the color change light emission pattern that changes the color of the illumination light are performed in a chronological sequence, and both a light emission amount and a light emission color are selected (set) by the user.

Specifically, the LED light emission unit 70 is first caused to emit light while continuously changing the light emission amount as described in the third embodiment in a state in which the light emission color is fixed at an initial specified color (for example, white). Then, when a desired light emission luminance is selected, by an operation by a user (for example, a release button operation) during the continuous change of the light emission luminance, the light emission luminance at the time of the release button operation is memorized. When light emission is being performed in this luminance change light emission pattern, a display is implemented on the LCD monitor 60 as illustrated in FIG. 15, FIG. 14 or the like and, overlapping the display, a message is displayed requesting operation of the release button to select a desired illumination luminance.

When the light emission luminance is selected (set) as described above, the LED light emission unit 70 continues on to emit light while continuously changing the light emission color as described in the second embodiment in a state in which the selected (memorized) light emission luminance is fixed. When a desired light emission color is selected, by an operation by the user (for example, a release button operation) during the continuous change of the light emission color, the light emission color at the time of the release button operation is memorized. When light emission is being performed in this color change light emission pattern, a display is implemented on the LCD monitor 60 as illustrated in FIG. 3, FIG. 8 or the like and, overlapping the display, a message is displayed requesting operation of the release button to select a desired illumination color.

Thus, first the light emission amount can be set and then the light emission color can be set, by the LED light emission unit 70 emitting light so as to first emit light in a light emission pattern that continuously changes the light emission amount (light emission luminance) and then go on to emit light in a light emission pattern that changes the light emission color of the illumination light continuously.

When the desired light emission amount (light emission luminance) and light emission color are selected and set as described above, illumination light with that light emission luminance and light emission color is emitted and photographing is performed. This photographing operation may be carried out at the same time as the timing of the release button operation when the light emission color is selected, or may be automatically imaged when the set color is emitted in a subsequent loop (second loop) of changing the light emission color as described in the above embodiments.

In the above description, it is described that the initially specified color of light that is emitted when setting the light emission luminance is white, but the initially specified color is not to be limited thus. For example, as described in the second embodiment, the color distribution of an photographing scene may be judged on the basis of outputs from the imaging device 11 (the through-image) and the most suitable light emission color (a color most resembling the color of the principal object in the photographing scene) automatically selected to be the initially specified color. Alternatively, a light emission color according to the photographing mode as described in the above variant example (1) may be automatically selected to be the initially specified color.

In the above description, a sequence is described of first setting the light emission amount (light emission luminance) and then setting the light emission color. Setting in the order as described above, light emission amount then light emission color, is the general rule but, depending on the case, it may be better to reverse the order of setting the light emission amount and the light emission color.

For example, if, rather than photographing with illumination light that substantially matches the color temperature of ambient light (external light) being illuminated, original (artistic) photographing is to be performed in which the object is illuminated with illumination light of a desired color (which is not necessarily a color conforming to the external light), it may be desirable to first set the color of the illumination light and then select a suitable luminance for bringing out the set illumination color. Thus, when a photographer desires this kind of photographing, a light emission pattern that continuously changes the color is first emitted and the color is set, and then a light emission pattern that continuously changes the luminance is emitted.

Whether the light emission luminance is to be continuously changed first (the light emission luminance is to be set first) or the light emission color is to be continuously changed first (the light emission color is to be set first) may be arbitrarily selectable beforehand by the user from a specifications menu screen.

Further, it may be automatically decided by the device (the camera) whether it is better to set the color before the luminance. For example, if the result of determining a color distribution of an photographing scene on the basis of outputs from the imaging device 11 (the through-image) is that the color distribution of the photographing scene is complicated (for example, if illumination light of various colors is illuminated at the principal object and the result is that a single color is not set as a color of the principal object), it is preferable to set the color of light emission first and then set a suitable light amount. Thus, if it is determined on the basis of the through-image that an photographing scene is this kind of photographing scene, the sequence of light emission from the LED light emission unit 70 is controlled such that first a light emission pattern that continuously changes the light emission color of the emission light is emitted and the light emission color is set by the user, and then a light emission pattern that continuously changes the light emission amount (light emission luminance) of the illumination light is emitted. If it is determined that an photographing scene is not this kind of photographing scene, the aforementioned general sequence is selected and executed (the light emission pattern that continuously changes the light emission amount is implemented before the light emission pattern that continuously changes the color, and the light emission color is set first).

(15) In the above described embodiments, the light emission pattern that changes the light emission amount of the illumination light (the light emission luminance) and the light emission pattern that changes the color of the illumination light are respectively separately specified. However, a light emission pattern that changes the light emission luminance and color simultaneously may be arbitrarily specifiable by a user.

Figure 18:
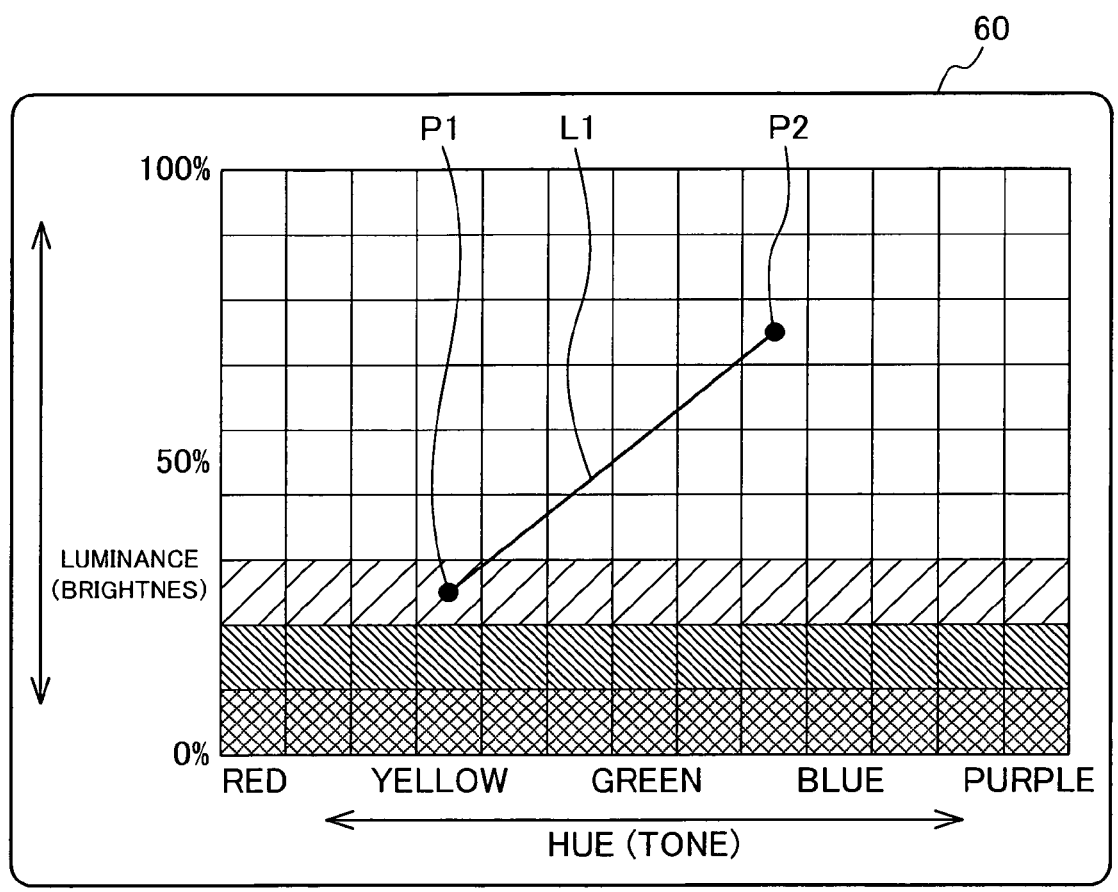
FIG. 18 is a diagram describing a variant embodiment of the present invention.

In this case, a color-luminance map (a color-luminance distribution) as in FIG. 18 may be displayed on the LCD monitor 60, with hue along the horizontal axis (red-yellow-green-blue-purple, with each color continuously changing by gradations) and luminance along the vertical axis (brightness, 0% to 100%). This color-luminance map is a map which, whatever color is selected on the horizontal axis, has white if luminance 100% is selected on the vertical axis and has black if luminance 0% is selected on the vertical axis. An arbitrary light emission change pattern is selected by the user, by the user operating the selector switch 33 and the set button 34. The LCD monitor 60 may be constituted to be operable as a touch panel, and a light emission change pattern may be designated by touch panel operations.

Figure 19:
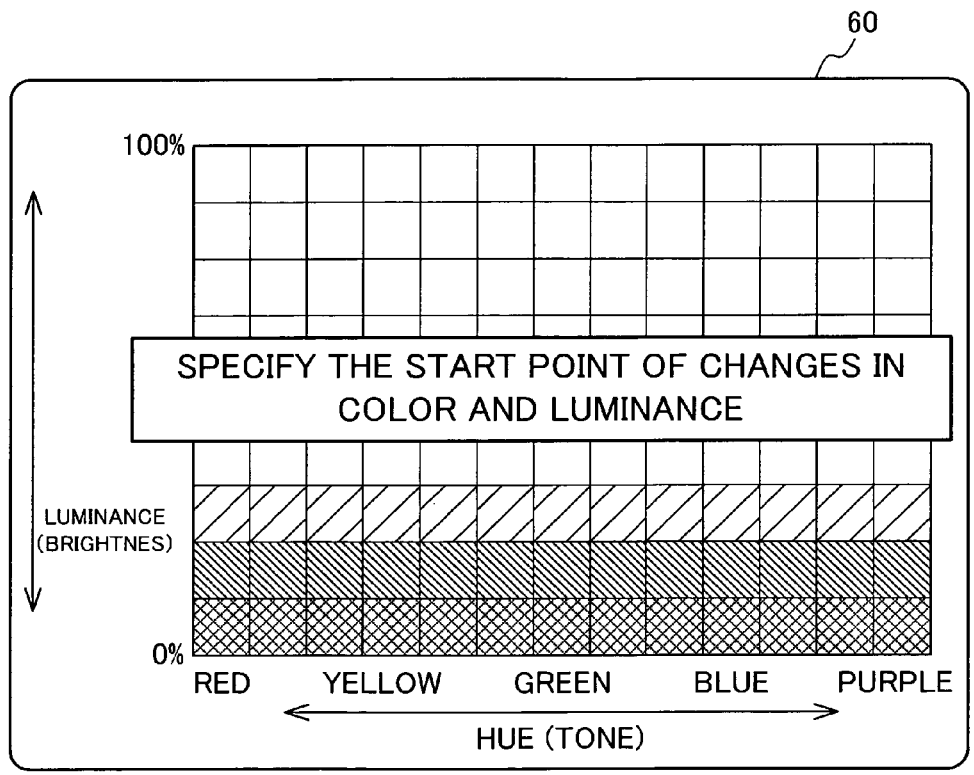
FIG. 19 is a diagram describing the variant embodiment of the present invention.
Figure 20:
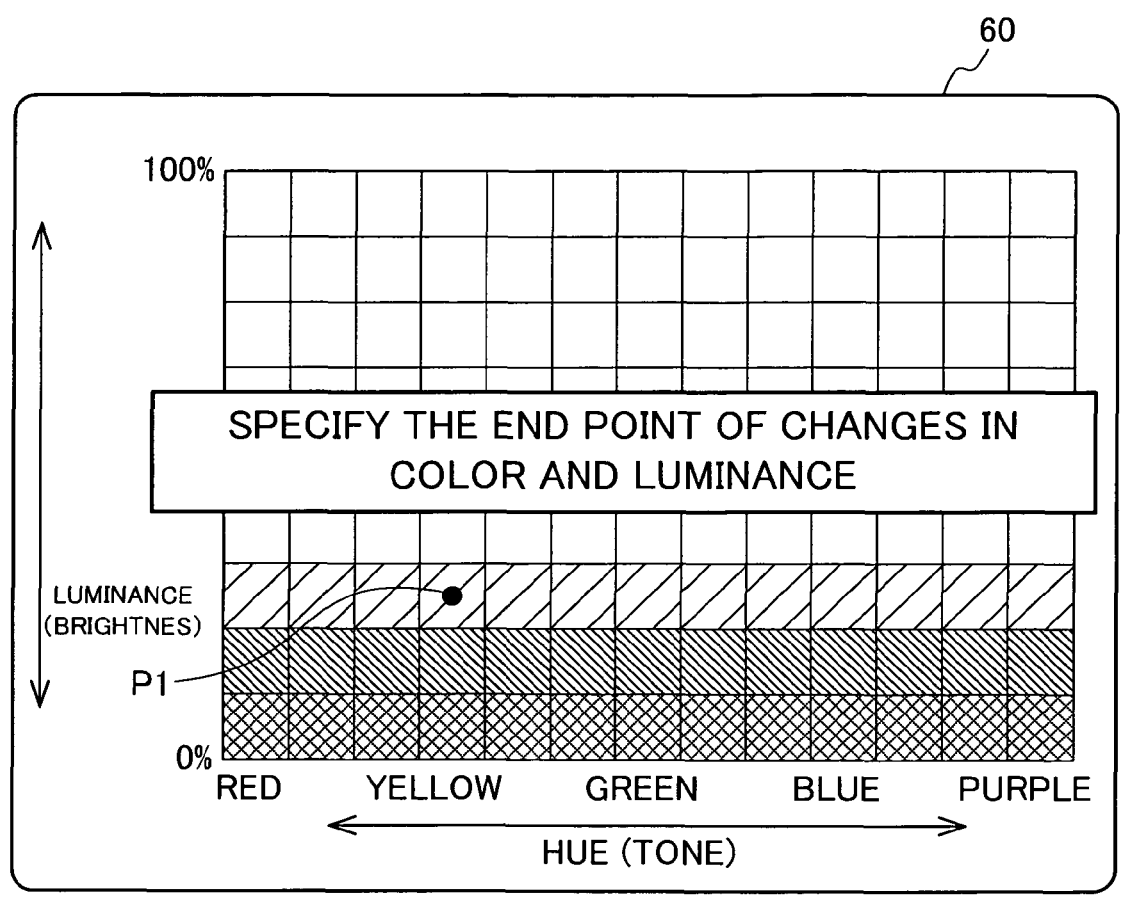
FIG. 20 is a diagram describing the variant embodiment of the present invention.

A method of selecting and setting a light emission pattern is described below using FIG. 18. First, in the state in which the color-luminance map of FIG. 18 is displayed on the LCD monitor 60, the user is prompted to specify a start point of the color-luminance change pattern. At this time, a message asking the user to specify the start point of changes of color and luminance is displayed overlapping the color-luminance map display as illustrated in FIG. 19. When the user performs operations to select an arbitrary position on the color-luminance map (for example, P1) with the selector switch 33 and set this position with the set button 34 (or performs touch operations on the touch panel within the color map display), a start point display mark P1 is displayed overlapping the color-luminance map display as illustrated in FIG. 18. Next, a message asking the user to specify the end point of the changes of color and luminance is displayed overlapping the color-luminance map display as illustrated in FIG. 20. When the user performs operations to select an arbitrary position on the color-luminance map (for example, P2) with the selector switch 33 and set this position with the set button 34 (or performs touch operations on the touch panel within the color-luminance map display), an end point display mark P2 is displayed overlapping the color-luminance map display as illustrated in FIG. 18. When the start point P1 and the end point P2 have been specified, a line L1 is displayed overlapping the color-luminance map display as in FIG. 18. Thus, a change pattern is specified that continuously changes the color and luminance (brightness) along the line L1 linking the start point P1 with the end point P2.

The invention claimed is:

1. An illumination device for photographing that emits illumination light for photographing by a camera, comprising:
    a light emission unit capable of emitting lights of a plurality of different colors as the illumination light; and
    a light emission control unit that controls the light emission unit and causes the light emission unit to continuously emit the illumination light while changing the color as time elapses, independently of photographing by the camera; and a setting unit that sets the color of the illumination light at a time of imaging, in accordance with an operation instruction according to an external operation that is inputted during the changing of the illumination light by the light emission control unit, wherein a change speed of the color is arbitrarily selectable.

2. The illumination device for photographing according to claim 1, wherein the light emission control unit is provided to be capable of selecting, as a mode in which the color of the illumination light is changed from a first color to a second color, a continuous change mode that emits continuous light while changing tone from the first color to the second color and a direct change mode that directly changes from the first color to the second color.

3. The illumination device for photographing according to claim 2, wherein the first color is a complementary color of the second color.

4. The illumination device for photographing according to claim 1, wherein a change pattern of the color can be arbitrarily specified.

5. The illumination device for photographing according to claim 4, wherein the light emission control unit sets the color change pattern on the basis of a result of photometry of object light.

6. The illumination device for photographing according to claim 1, wherein the light emission control unit can pause the change of color and cause the light emission unit to emit illumination light of an arbitrary color.

7. The illumination device for photographing according to claim 1, wherein the light emission control unit causes the light emission unit to emit light, switching in a chronological sequence between a first light emission pattern that continuously emits the illumination light while changing a light emission amount and a second light emission pattern that continuously changes the illumination light while changing the color.

8. The illumination device for photographing according to claim 7, wherein the light emission control unit causes light emission to be executed in the second light emission pattern, after the first light emission pattern is executed and the light emission amount is set.

9. The illumination device for photographing according to claim 7, wherein the first light emission pattern includes a plurality of light emission amount changing light emission patterns with mutually different modes of light emission amount change, the second light emission pattern includes a plurality of color changing light emission patterns with mutually different modes of color change, and the light emission control unit selects a corresponding light emission pattern from the plurality of light emission amount changing light emission patterns and/or the plurality of color changing light emission patterns on the basis of a plurality of photographing modes specified in advance in the camera for performing exposure control in accordance with photographing scenes.

10. A camera capable of using the illumination device for photographing according to claim 1 comprising:

a display unit capable of displaying a color distribution in which hues and brightnesses of the illumination light are arranged in a matrix, and a light emission pattern input and specification unit capable of specifying and inputting a continuous change pattern of hue and brightness of the illumination light on the color distribution displayed at the display unit.

11. A camera using the illumination device for photographing according to claim 1 comprising:

an imaging unit that converts object light to electronic signals and outputs the same;

a display unit that displays a through-image generated on the basis of output from the imaging unit; and a display control unit that causes at least one of a change pattern of color of the illumination light and a state of change of color of the illumination light to be displayed at the display unit together with the through-image.

12. The camera according to claim 11, wherein a partial region of the through-image is displayed magnified at the display unit during illumination of the illumination light, and the display unit displays the whole of the through-image and displays the magnified display superimposed on the display of the whole of the through-image.

13. The camera according to claim 11, wherein the illumination device for photographing keeps the color of the illumination light constant while the imaging unit is imaging an image to be recorded to a recording medium.

14. The camera according to claim 11, wherein a photographing control unit is provided that, if a photographing start instruction signal is inputted during illumination of the illumination light, accordingly executes an photographing operation of a still image, and the light emission control unit continues illumination of the illumination light when the photographing control unit finishes the photographing operation and if the photographing start instruction signal is inputted a plurality of times during illumination of the illumination light, the photographing control unit executes the photographing operation in accordance with each of the plurality of inputs.

15. The camera according to claim 14 wherein, if a photographing reservation signal is inputted during illumination of the illumination light, the photographing control unit accordingly accepts the photographing reservation and executes the photographing operation when the color of the illumination light changes and is again substantially the same as the color at the moment at which the photographing reservation signal was inputted.

16. The camera according to claim 15, wherein the light emission control unit, before or after performing the photographing operation in accordance with the photographing reservation, performs control to continuously change a light amount of the illumination light while fixing the color of the illumination light at the color at the moment at which the photographing reservation signal was inputted, and the photographing control unit also performs a photographing operation at least one of a timing earlier and a timing later than a timing at which the light amount is substantially the same as the light amount at the moment at which the photographing reservation signal was inputted.

17. The camera according to claim 11, further comprising:

a release operation member provided to be externally operable to cause a photographing operation to be executed; and a light emission instruction operation member provided to be externally operable separately from the release operation member; wherein in accordance with an operation of the release operation member, the light emission control unit starts control that causes the color of the illumination light to change, and in accordance with an operation of the light emission instruction operation member, the light emission control unit starts control that causes the color of the illumination light to change.

18. The camera according to claim 11, wherein the illumination light illuminated from the illumination device for photographing is used as an autofocus assist beam during an autofocus operation, the color of the autofocus assist beam is emitted with a color matching a spectral response characteristic of a light detection sensor, and the illumination device for photographing starts emission of the illumination light directly after finishing illumination of the illumination light as the autofocus assist beam.

19. The illumination device for photographing according to claim 1, wherein the light emission control unit is provided with, as modes in which the light emission amount of the illumination light is changed, a light emission amount increasing mode that progressively increases a light emission amount of the illumination light as time elapses and a light emission amount decreasing mode that progressively decreases the light emission amount of the illumination light as time elapses.

20. The illumination device for photographing according to claim 19, wherein the light emission control unit can arbitrarily specify a change speed and/or a change range of the light emission amount.

21. The illumination device for photographing according to claim 19, wherein the light emission control unit can set a change range of the light emission amount on the basis of a result of photometry of object light.

22. The illumination device for photographing according to claim 19, wherein the illumination light illuminated from the illumination device for photographing is used as an autofocus assist beam during an autofocus operation, and the illumination device for photographing starts control to change the light emission amount of the illumination light directly after finishing illumination of the illumination light as the autofocus assist beam.

23. The illumination device for photographing according to claim 19, wherein the illumination device for photographing keeps the light amount of the illumination light constant while the imaging unit is imaging an image to be recorded to a recording medium.

24. A camera using the illumination device for photographing according to claim 19, the camera providing:

an imaging unit that converts object light to electronic signals and outputs the same;

a display unit that displays a through-image generated on the basis of output from the imaging unit; and a display control unit that, in a state in which the through-image is displayed at the display unit, performs control to, while illuminating continuous light at the object from an illumination device that illuminates illumination light for photographing, change the light emission amount of the illumination light.

25. The camera according to claim 24, wherein the display unit is provided to be capable of displaying an indicator representing a state of change of the light emission amount of the illumination light.

26. The camera according to claim 24, wherein a partial region of the through-image is displayed magnified at the display unit during illumination of the illumination light, and the display unit displays the whole of the through-image and displays the magnified display superimposed on the display of the whole of the through-image.

27. The camera according to claim 24, wherein an photographing control unit is provided that, if an photographing start instruction signal is inputted during illumination of the illumination light, accordingly starts a photographing operation, and the light emission control unit continues illumination of the illumination light when the photographing control unit starts the photographing operation, and if the photographing start instruction signal is inputted a plurality of times during illumination of the illumination light, the photographing control unit starts the photographing operation in accordance with each of the plurality of inputs.

28. The camera according to claim 27 wherein, if a photographing reservation signal is inputted during illumination of the illumination light, the photographing control unit accordingly accepts the photographing reservation and starts the photographing operation when the light emission amount of the illumination light changes and the light emission amount is again substantially the same as the light emission amount at the moment at which the photographing reservation signal was inputted.

29. The camera according to claim 28 wherein, when the photographing control unit performs the photographing operation in accordance with the photographing reservation, the photographing control unit also performs an photographing operation at least one of a timing earlier and a timing later than a timing at which the photographing operation is performed.

30. The camera according to claim 24, further comprising:

a release operation member provided to be externally operable to cause a photographing operation to be executed; and a light emission instruction operation member provided to be externally operable separately from the release operation member, wherein in accordance with an operation of the release operation member, the light emission control unit starts the control, and in accordance with an operation of the light emission instruction operation member, the light emission control unit starts the control.

* * * * *